US012794361B2

(12) United States Patent
Ding et al.

(10) Patent No.: US 12,794,361 B2
(45) Date of Patent: Nov. 10, 2026

(54) CHARGER, A MULTIPLEXING CURRENT CONVERSION CIRCUIT AND AN UNINTERRUPTIBLE POWER SUPPLY INCLUDING THE SAME

(71) Applicant: LIAN ZHENG ELECTRONICS (SHENZHEN) CO., LTD., Shenzhen (CN)

(72) Inventors: Yusong Ding, Shenzhen (CN); Kai Liu, Shenzhen (CN); Zhongyong Xu, Shenzhen (CN)

(73) Assignee: LIAN ZHENG ELECTRONICS (SHENZHEN) CO., LTD., Shenzhen (CN)

(*) Notice: Subject to any disclaimer, the term of this patent is extended or adjusted under 35 U.S.C. 154(b) by 831 days.

(21) Appl. No.: 18/165,783

(22) Filed: Feb. 7, 2023

(65) Prior Publication Data

US 2023/0253879 A1 Aug. 10, 2023

(30) Foreign Application Priority Data

Feb. 9, 2022 (CN) ........................ 202210121442.6

(51) Int. Cl.

| | |
|---|---|
| ***H02M 3/155*** | (2006.01) |
| ***H02J 7/70*** | (2026.01) |
| ***H02J 9/06*** | (2006.01) |
| ***H02M 1/42*** | (2007.01) |

(52) U.S. Cl.
CPC ............... *H02M 3/155* (2013.01); *H02J 7/70* (2026.01); *H02J 9/061* (2013.01); *H02M 1/42* (2013.01)

(58) Field of Classification Search
CPC ............................. H02J 7/0042; H02M 3/155
USPC ......................................................... 320/145
See application file for complete search history.

(56) References Cited

U.S. PATENT DOCUMENTS

2023/0028214 A1* 1/2023 Yamakawa ........... H01F 27/263

FOREIGN PATENT DOCUMENTS

| | | |
|---|---|---|
| CN | 108809094 | * 11/2018 |
| KR | 101627620 | 6/2016 |

OTHER PUBLICATIONS

Extended European Search Report, EP Application No. 23155546.7, dated Jun. 23, 2023, 8 pages.

* cited by examiner

*Primary Examiner* — Nathaniel R Pelton
(74) *Attorney, Agent, or Firm* — Stanek Lemon Crouse & Meeks, PA

(57) ABSTRACT

The present invention provides a charger, a multiplexing current conversion circuit and an uninterruptible power supply including the same. The charger includes a positive side arm, a negative side arm, a middle arm, and a unidirectional conduction circuit.

11 Claims, 14 Drawing Sheets

CHARGER, A MULTIPLEXING CURRENT CONVERSION CIRCUIT AND AN UNINTERRUPTIBLE POWER SUPPLY INCLUDING THE SAME

CROSS-REFERENCE TO RELATED APPLICATIONS

The present application claims priority to Chinese Patent Application No. 202210121442.6 filed on Feb. 9, 2022, entitled A CHARGER, A MULTIPLEXING CURRENT CONVERSION CIRCUIT AND AN UNINTERRUPTIBLE POWER SUPPLY INCLUDING THE SAME, the disclosure of which is incorporated herein by reference in its entirety.

TECHNICAL FIELD

The present invention relates to the field of electricity and electronics, and specifically to a charger, a multiplexing current conversion circuit and an uninterruptible power supply including the same.

BACKGROUND

Uninterruptible power supplies are widely used in industrial, commercial, and consumption fields because of capable of instantaneously switching to continuous power supply of batteries to loads when the power supply of the utility power enters an abnormal state to protect the loads from damage from interruptions in power supply of utility power. At present, a high profile development direction of uninterruptible power supplies is to reduce the number of batteries (for example, by designing as a single battery), reduce battery voltage, and avoid the introduction of neutral lines in battery circuits. Such uninterruptible power supplies usually include an AC-DC power factor control (PFC) circuit for converting alternating current inputted from an alternating current input terminal into direct current, a circuit for charging a battery, and a DC-DC circuit for discharging the battery. For a single-battery uninterruptible power supply, a charging circuit for a battery needs to be designed. In a common charging circuit in the prior art, two sides of positive and negative direct current buses (dual buses) of an AC-DC circuit are used to simultaneously supply energy to a battery. For an uninterruptible power supply with a single-phase utility power input, large ripples in the uninterruptible power supply lead to the need for a large bus capacitor, making it more difficult to control a direct current bus. For uninterruptible power supplies within a power range of 5 KVA to 11 KVA, voltages of positive and negative direct current buses are usually 700 V, and a charging voltage expected for a single battery is approximately 200 V. There is a clear difference between the two voltage ranges, and as a result a charging circuit has low efficiency. In another charging circuit, a single side of positive and negative direct current buses is used to alternately supply energy to a battery, and charging efficiency is increased compared with the former charging circuit.

FIG. 1 shows a dual-bus alternate buck charging circuit 12 in the prior art. A positive direct current bus 101 is connected to a positive output terminal 103 of the charging circuit by a switching transistor Q13 and an inductor L13 to form a positive side. A negative direct current bus 102 is connected to a negative output terminal 104 of the charging circuit by a switching transistor Q14 and an inductor L14 to form a negative side. A capacitor C10 is connected between the positive output terminal 103 and the negative output terminal 104. A positive electrode of the diode D15 is connected to a negative electrode of a diode D16. A negative electrode of the diode D15 is connected to a node between the switching transistor Q13 and the inductor L13. A positive electrode of the diode D16 is connected to a node between the switching transistor Q14 and the inductor L14. A node between the diode D15 and the diode D16 and a node between direct current bus capacitors C11, C12 are both connected to a neutral point N. A buck circuit topology is that the positive and negative sides operate alternately. Therefore, in the buck circuit topology, there is also a problem of high frequency jumps in a potential of the positive output terminal 103 or the negative output terminal 104. The charging circuit 12 is used as an example below to exemplarily describe the cause of such high frequency jumps.

FIG. 2 is a schematic diagram of a pulse width modulation control signal received by gates of Q13 and Q14, corresponding current waveforms, and jumps of a potential of the negative output terminal 104 relative to the neutral point when the dual buses of the charging circuit shown in FIG. 1 alternately perform charging. As shown in FIG. 2, when the positive direct current bus 101 performs charging, Q13 is controlled to perform pulse width modulation, and Q14 remains in an off state. A terminal of the inductor L14 is connected to the neutral point N by the diode D16. When the switching transistor Q13 is turned on, an inductor charging process is performed, and the current direction is: the positive direct current bus 101→the switching transistor Q13→the inductor L13→the capacitor C10→the inductor L14→the diode D16→the neutral point N. In this case, because the inductor L14 is charged, a voltage at one terminal of the inductor L14 connected to the neutral point N is lower than that at the other terminal of the inductor L14. That is, the potential of the negative output terminal 104 relative to the neutral point N is positive. When the switching transistor Q13 is turned off, an inductor freewheeling process is performed, and the current direction is: the inductor L13→the capacitor C10→the inductor L14→the diode D16→the diode D15→the inductor L13. In this case, because the inductor L14 is freewheeling and discharging, a voltage at one terminal of the inductor L14 connected to the neutral point N is higher than that at the other terminal of the inductor L14. That is, the potential of the negative output terminal 104 relative to the neutral point N is negative. As can be seen, the voltage of the negative output terminal 104 has high frequency jumps on the positive and negatives sides with the neutral point N as a reference along with a switching action of pulse width modulation of the switching transistor Q13. Because a voltage between the positive output terminal 103 and the negative output terminal 104 is constant, the positive output terminal 103 also has high frequency jumps. A jumping frequency is equal to a frequency of Q1 pulse width modulation. Therefore, the circuit topology has a poor electromagnetic compatibility (EMC) characteristic.

SUMMARY

For the foregoing technical problems in the prior art, in one aspect, the present invention provides a charger, including a positive side arm, a middle arm, a negative side arm, and a unidirectional conduction circuit, where one of the positive side arm and the negative side arm is provided with a first inductor;

the positive side arm is connected between a positive direct current bus and a positive electrode of a battery; the negative side arm is connected between a negative direct current bus and a negative electrode of the battery; and the middle arm is connected to a neutral point, the unidirectional conduction circuit is connected among the positive side arm, the middle arm, and the negative side arm to enable current to only flow from the negative side arm to the positive side arm and/or the middle arm; and the charger is alternately powered by the positive and negative direct current buses to charge the battery, where the charger alternately connects one electrode of the positive electrode and the negative electrode of the battery to the neutral point and one of the positive and negative direct current buses that has the same polarity as the electrode, to enable a level of the electrode of the battery to synchronously and alternately rise or drop along with alternate supply of power to the positive and negative direct current buses.

Preferably, the positive side arm includes a first switching transistor, the negative side arm includes a second switching transistor, the middle arm includes a third switching transistor, and the unidirectional conduction circuit includes a first diode and a second diode that are connected in forward series;

a first terminal of the positive side arm is connected to the positive direct current bus to receive power, and a second terminal of the positive side arm is connected to the positive electrode of the battery to reduce voltage and output power; and a first terminal of the negative side arm is connected to the negative direct current bus to receive power, and a second terminal of the negative side arm is connected to the negative electrode of the battery to reduce voltage and output power; and the charger further includes a first capacitor connected in series between the second terminal of the positive side arm and the second terminal of the negative side arm.

Preferably, each of the first switching transistor, the second switching transistor, and the third switching transistor is controlled by a control terminal of the switching transistor to enable current to flow from a first terminal of the switching transistor to a second terminal of the switching transistor or to be cut off; and each of the first switching transistor, the second switching transistor, and the third switching transistor is connected with a diode in reverse parallel from the first terminal to the second terminal.

Preferably, the positive side arm includes the first inductor, where the first terminal of the first switching transistor is used as the first terminal of the positive side arm, the second terminal of the first switching transistor is connected to a first terminal of the first inductor, and a second terminal of the first inductor is used as the second terminal of the positive side arm;

the second terminal of the second switching transistor is used as the first terminal of the negative side arm, and the first terminal of the second switching transistor is used as the second terminal of the negative side arm; and the first terminal of the third switching transistor is connected to the neutral point, the second terminal of the third switching transistor is connected to a node formed by a connection between an anode of the first diode and a cathode of the second diode, a cathode of the first diode is connected to a node formed by a connection between the second terminal of the first switching transistor and the first terminal of the first inductor, and an anode of the second diode is connected to the first terminal of the second switching transistor.

Preferably, in response to the positive direct current bus supplying power to the charger, the first switching transistor performs pulse width modulation to reduce voltage and output power, where the negative side arm is connected to the neutral point by the third switching transistor; and in response to the negative direct current bus supplying power to the charger, the third switching transistor performs pulse width modulation to reduce voltage and output power, where the negative side arm is connected to the negative direct current bus by the second switching transistor.

Preferably, during supply of power to the positive direct current bus: in response to the first switching transistor being turned on to enable the positive direct current bus, the first inductor, the first capacitor, and the neutral point to form a loop, the first inductor stores energy, and in response to the first switching transistor being turned off to enable the first inductor and the first capacitor to form a loop, the first inductor supplies power to the respective second terminals of the positive side arm and the negative side arm; and during supply of power to the negative direct current bus: in response to the third switching transistor being turned on to enable the neutral point, the first inductor, the first capacitor, and the negative direct current bus to form a loop, the first inductor stores energy, and in response to the third switching transistor being turned off to enable the first inductor and the first capacitor to form a loop, the first inductor supplies power to the respective second terminals of the positive side arm and the negative side arm.

Preferably, the first terminal of the first switching transistor is used as the first terminal of the positive side arm, and the second terminal of the first switching transistor is used as the second terminal of the positive side arm;

the negative side arm includes the first inductor, where the second terminal of the second switching transistor is used as the first terminal of the negative side arm, the first terminal of the second switching transistor is connected to a first terminal of the first inductor, and a second terminal of the first inductor is used as the second terminal of the negative side arm; and the second terminal of the third switching transistor is connected to the neutral point, the first terminal of the third switching transistor is connected to a node formed by a connection between an anode of the first diode and a cathode of the second diode, a cathode of the first diode is connected to a node formed by a connection between the second terminal of the first switching transistor and the first terminal of the first inductor, and an anode of the second diode is connected to the first terminal of the second switching transistor.

Preferably, in response to the positive direct current bus supplying power to the charger, the third switching transistor performs pulse width modulation to reduce voltage and output power, where the positive side arm is connected to the positive direct current bus by the first switching transistor; and in response to the negative direct current bus supplying power to the charger, the second switching transistor performs pulse width modulation to reduce voltage and output power, where the positive side arm is connected to the neutral point by the third switching transistor.

Preferably, during supply of power to the positive direct current bus: in response to the third switching transistor being turned on to enable the positive direct current bus, the first capacitor, the first inductor, and the neutral point to form a loop, the first inductor stores energy, and in response to the third switching transistor being turned off to enable the first inductor and the first capacitor to form a loop, the first inductor supplies power to the respective second terminals of the positive side arm and the negative side arm; and during supply of power to the negative direct current bus: in response to the second switching transistor being turned on to enable the neutral point, the first capacitor, the first inductor, and the negative direct current bus to form a loop, the first inductor stores energy, and in response to the second switching transistor being turned off to enable the first inductor and the first capacitor to form a loop, the first inductor supplies power to the respective second terminals of the positive side arm and the negative side arm.

Preferably, the first to third switching transistors are insulated gate bipolar transistors, the first terminals of the first to third switching transistors are collectors, and the second terminals of the first to third switching transistors are emitters.

Preferably, the first to third switching transistors are metal-oxide-semiconductor field effect transistors or thyristors.

The second aspect of the present invention provides a multiplexing current conversion circuit. The multiplexing current conversion circuit includes a power factor correction (PFC) and DC-DC multiplexing converter and the charger in the above-mentioned one aspect of the present invention.

Preferably, the PFC and DC-DC multiplexing converter of the multiplexing current conversion circuit includes a multiplexing bridge arm, a battery hookup bridge arm, and a control module, where the multiplexing bridge arm includes:

a second inductor, where a first terminal of the second inductor is selectively connected to utility power or the battery;

a fourth switching transistor and a fifth switching transistor which are connected in reverse series between a second terminal of the second inductor and the neutral point;

a second capacitor connected between the positive direct current bus and the neutral point and a third capacitor connected between the neutral point and the negative direct current bus; and a third diode and a sixth switching transistor, where an anode of the third diode and a first terminal of the sixth switching transistor are connected together to the second terminal of the second inductor, a cathode of the third diode is connected to the positive direct current bus, and a second terminal of the sixth switching transistor is connected to the negative direct current bus;

the battery hookup bridge arm is connected between the battery and the multiplexing bridge arm to control the battery to alternately supply power to the positive and negative direct current buses, where a middle bridge arm of the charger and the battery hookup bridge arm of the PFC and DC-DC multiplexing converter are multiplexed;

the control module is configured to control switching transistors or switches in the PFC and DC-DC multiplexing converter or the charger; and where the PFC and DC-DC multiplexing converter controls one electrode of the positive electrode and the negative electrode of the battery to be alternately connected to the neutral point and one of the positive and negative direct current buses that has the same polarity as the electrode, to enable a level of the electrode of the battery to synchronously and alternately rise or drop along with the alternate supply of power to the positive and negative direct current buses; or controls one electrode of the positive electrode and the negative electrode of the battery to be constantly connected to the neutral point.

Preferably, the multiplexing current conversion circuit only includes the charger of any one of claims 4 to 6, and that the middle bridge arm of the charger and the battery hookup bridge arm of the PFC and DC-DC multiplexing converter are multiplexed includes:

the second terminal of the third switching transistor is further connected to the negative electrode of the battery for use as a part of the battery hookup bridge arm.

Preferably, the middle bridge arm of the charger and the battery hookup bridge arm of the PFC and DC-DC multiplexing converter are multiplexed further includes:

the second diode of the unidirectional conduction circuit of the charger is further connected between the negative direct current bus and the negative electrode of the battery for use as a part of the battery hookup bridge arm.

The third aspect of the present invention provides an uninterruptible power supply, including:

the multiplexing current conversion circuit in any item of the above-mentioned second aspect of the present invention, where the battery is a single rechargeable battery.

The charger, the current converter, and the uninterruptible power supply including the same of the present invention adopt a multiplexing circuit design in which battery charge-discharge potentials have fewer jumps, have higher level of integration, lower costs, and better electromagnetic compatibility characteristics, and are more applicable to a single-battery uninterruptible power supply system.

BRIEF DESCRIPTION OF THE DRAWINGS

Embodiments of the present invention are further described below with reference to the accompanying drawings, in which.

DETAILED DESCRIPTION

To make the objectives, technical schemes, and advantages of the present invention more comprehensible, the present invention is further described below in detail with reference to the accompanying drawings and specific embodiments. The following exemplarily show various charging circuits with a single-battery uninterruptible power supply and various preferred embodiments of uninterruptible power supply circuits formed by combining the charging circuits and a power factor control (PFC) and DC-DC multiplexing circuit (that is, a multiplexing converter circuit formed by an AC-DC PFC circuit and a battery discharging DC-DC circuit) in a form of multiplexing elements.

It should be noted that a control module that applies a control signal to a gate of a switching transistor to perform pulse width modulation is not described in detail in the various embodiments of the present invention to maintain focus in the description. Based on the teachings herein, those having ordinary skill in the art will readily understand how to implement the control module.

Embodiment One

Figure 3:
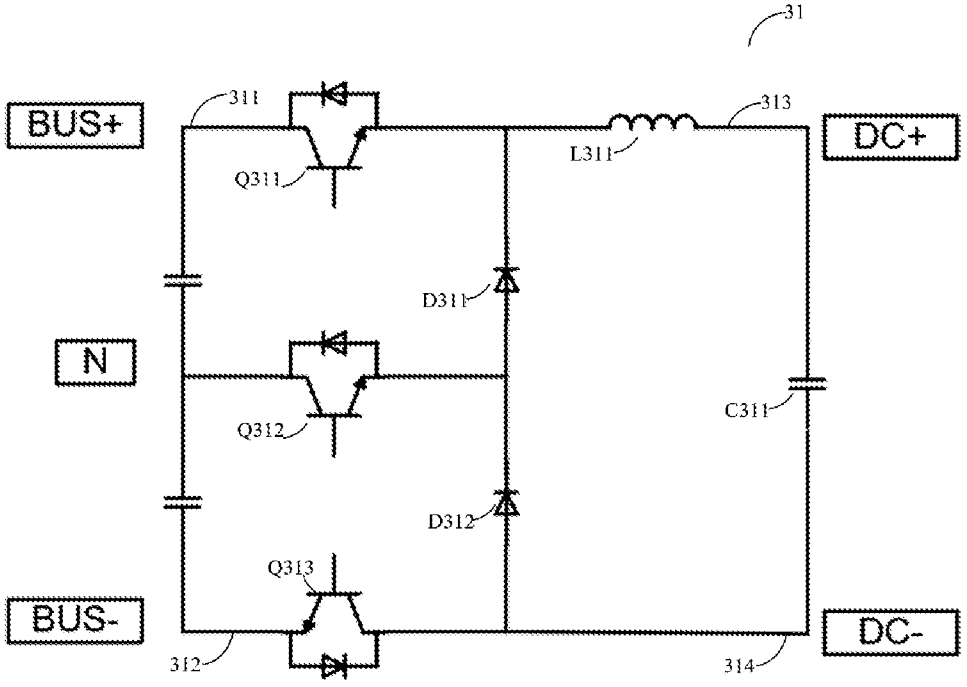
FIG. 3 shows a charging circuit of an uninterruptible power supply apparatus according to a preferred embodiment of this application.

FIG. 3 shows a charging circuit (charger) of an uninterruptible power supply apparatus according to a preferred embodiment of this application. A circuit of the uninterruptible power supply apparatus includes a multiplexing current conversion circuit. The multiplexing current conversion circuit can respectively obtain alternating current power from an alternating current power supply or obtain direct current power from a single rechargeable battery, and convert the alternating current or direct current power into required direct current power to be supplied to positive and negative direct current buses. An input terminal of the charging circuit according to the embodiments of the present invention is connected to the positive and negative direct current buses outputting power of the multiplexing current conversion circuit, and an output terminal of the charging circuit is connected to the single rechargeable battery, to reduce voltage and charge the single rechargeable battery by means of the power of the positive and negative direct current buses.

A charging circuit 31 includes a switching transistor Q311, a switching transistor Q312, a switching transistor Q313, a diode D311, a diode D312, a inductor L311, and a capacitor C311. The switching transistor Q311 and the inductor L311 are connected in series between a positive direct current bus 311 and a positive output terminal 313 as a positive side arm. The switching transistor Q313 is connected in series between a negative direct current bus 312 and a negative output terminal 314 as a negative side arm. The switching transistor Q312 forms a middle arm. One terminal of the switching transistor Q312 is connected to a node 313 formed between positive and negative bus capacitors, and the other terminal of the switching transistor Q312 is connected to a node formed between the two diodes D311 and D312 connected in forward series.

Specifically, a collector of the switching transistor Q311 is connected to the positive direct current bus 311 of the PFC and DC-DC multiplexing circuit. A collector of the switching transistor Q312 is connected to a node formed between a positive direct current bus capacitor C312 and a negative direct current bus capacitor C313 and is therefore connected to a neutral point N. An emitter of the switching transistor Q313 is connected to the negative direct current bus 312.

An emitter of the switching transistor Q311 is connected to one terminal of the inductor L311, and the other terminal of the inductor is connected to the positive output terminal 313 of the charging circuit 31. The positive output terminal 313 is used to be connected to a positive electrode of a single battery during charging of the single battery. A collector of the switching transistor Q313 is connected to the negative output terminal 314 of the charging circuit 31. The negative output terminal 314 is used to be connected to a negative electrode of the single battery during charging of the single battery.

An anode of the diode D311 is connected to a cathode of the diode D312. A cathode of the diode D311 is connected to a node formed between the emitter of the switching transistor Q311 and the inductor L311. An anode of the diode D312 is connected to the collector of the switching transistor Q313. An emitter of the switching transistor Q312 is connected to a node formed by a connection between the anode of the diode D311 and the cathode of the diode D312. The capacitor C311 is connected in series between the positive output terminal 313 and the negative output terminal 314.

An operating status of the charging circuit 31 is described below in detail.

In the charging circuit 31, the positive and negative direct current buses alternately buck voltage and supply power to the positive output terminal 313 and the negative output terminal 314. The positive output terminal 313 and the negative output terminal 314 are usually connected to the single battery of the uninterruptible power supply by a relay to charge the single battery.

Figure 4:
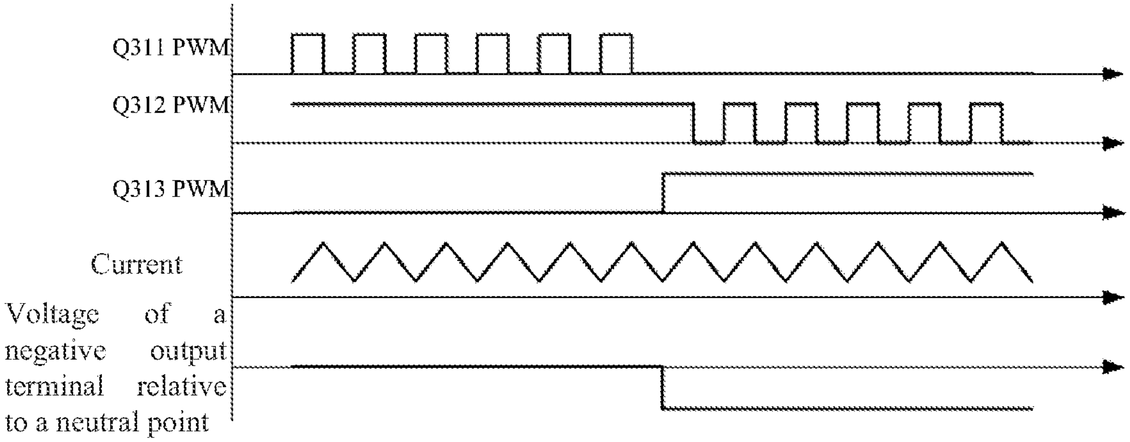
FIG. 4 is a schematic diagram of control signals and current and voltage waveforms in a power supply cycle of a positive direct current bus (a positive half cycle) and a power supply cycle of a negative direct current bus (a negative half cycle) of the charging circuit in FIG. 3.

FIG. 4 is a schematic diagram of control signals and current and voltage waveforms in a power supply cycle of a positive direct current bus (a positive half cycle) and a power supply cycle of a negative direct current bus (a negative half cycle) of the charging circuit in FIG. 3. Control signals outputted by a control module to gates of the switching transistor Q311, the switching transistor Q312, and the switching transistor Q313, current flowing in a loop (for example, on the inductor L311), and a level of the negative output terminal 314 relative to the neutral point N are specifically shown.

Figure 5A:
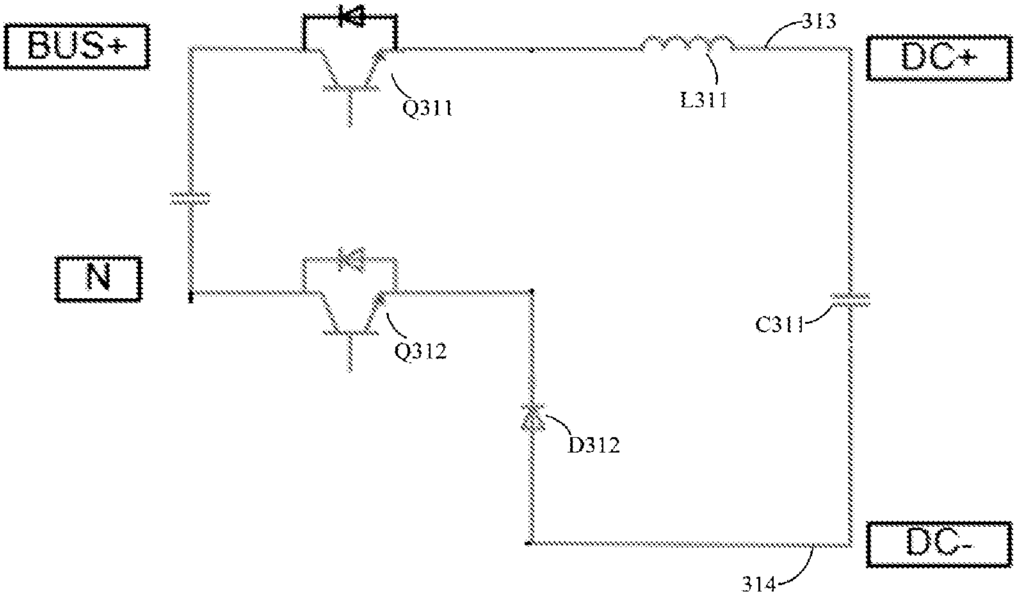
FIG. 5*a* and FIG. 5*b* are respectively schematic diagrams of equivalent circuits corresponding to a process in which the positive direct current bus stores energy in an inductor (FIG. 5*a*) and a process in which the inductor supplies power to positive and negative output terminals (FIG. 5*b*) in the positive half cycle of the charging circuit in FIG. 3.
Figure 5B:
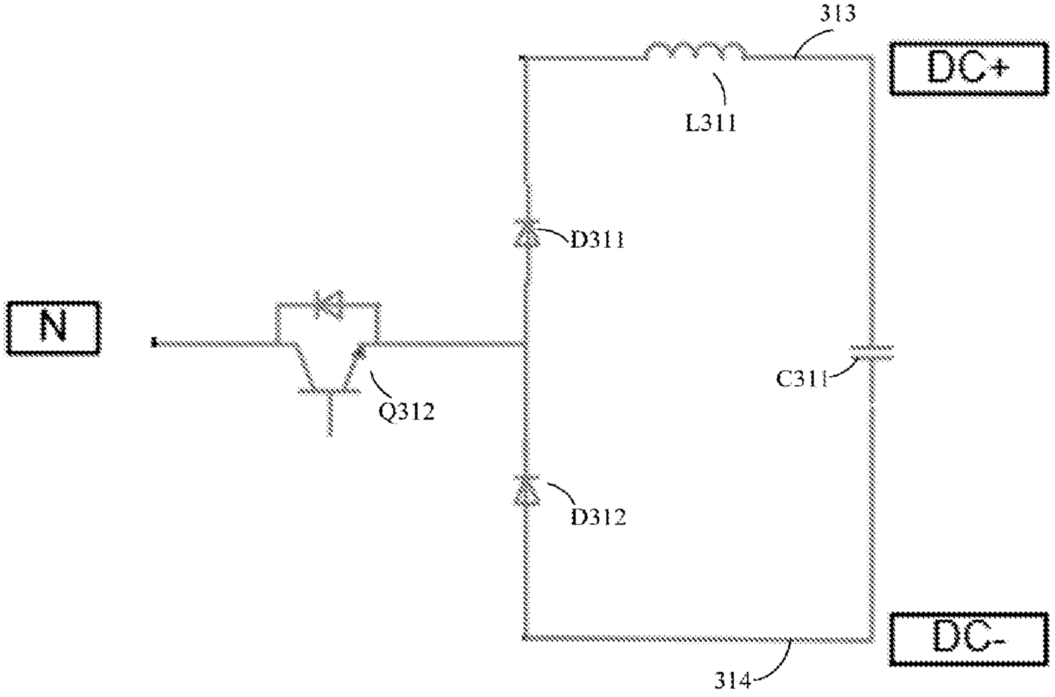

FIG. 5*a* and FIG. 5*b* are respectively schematic diagrams of equivalent circuits corresponding to a process in which the positive direct current bus stores energy in an inductor (FIG. 5*a*) and a process in which the inductor supplies power to positive and negative output terminals (FIG. 5*b*) in the foregoing positive half cycle of the charging circuit in FIG. 3.

In the positive half cycle (corresponding to the left side in FIG. 4), the positive direct current bus 311 supplies power, the switching transistor Q312 remains on, the switching transistor Q313 remains off, and the switching transistor Q311 performs pulse width modulation. When the switching transistor Q311 is turned on, the current direction is: the positive direct current bus 311→the switching transistor Q311→the inductor L311→the capacitor C311→the diode D312→the switching transistor Q312→the neutral point N. In this process, the positive direct current bus 311 stores energy in the inductor L311 and supplies power to the positive and negative output terminals 313, 314. When the switching transistor Q311 is turned off, the inductor L311 is freewheeling and discharging, the current direction is: the inductor L311→the capacitor C311→the diode D312→the diode D311, where the inductor L311 supplies power between the positive and negative output terminals 313, 314.

Figure 6A:
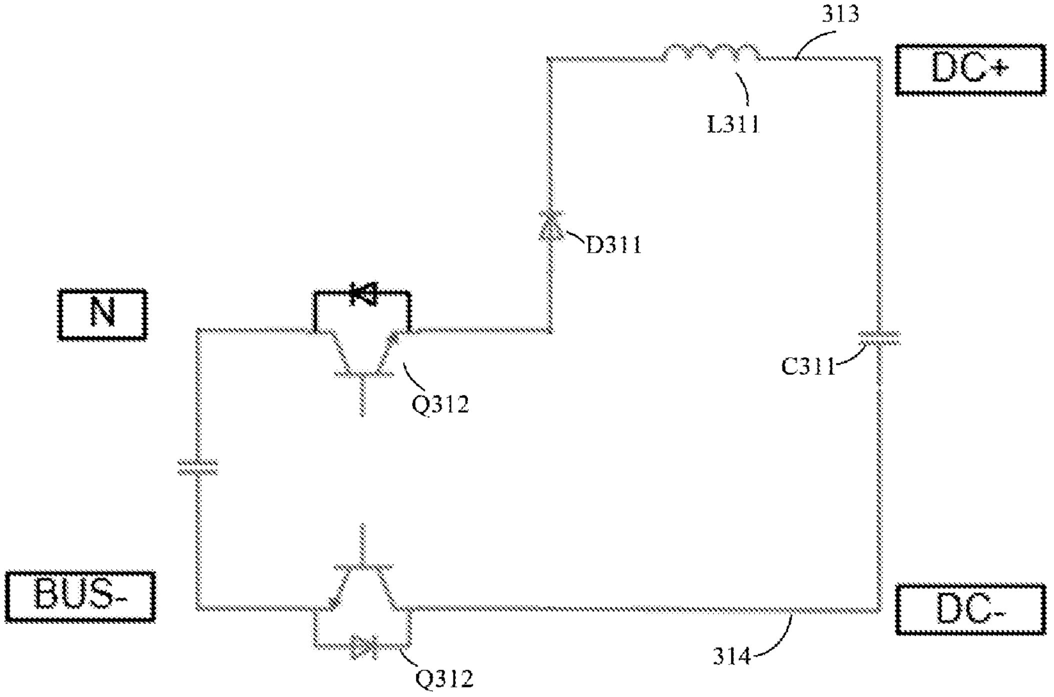
FIG. 6*a* and FIG. 6*b* are respectively schematic diagrams of equivalent circuits corresponding to a process in which the negative direct current bus stores energy in an inductor (FIG. 6*a*) and a process in which the inductor supplies power to positive and negative output terminals (FIG. 6*b*) in the negative half cycle of the charging circuit in FIG. 3.
Figure 6B:
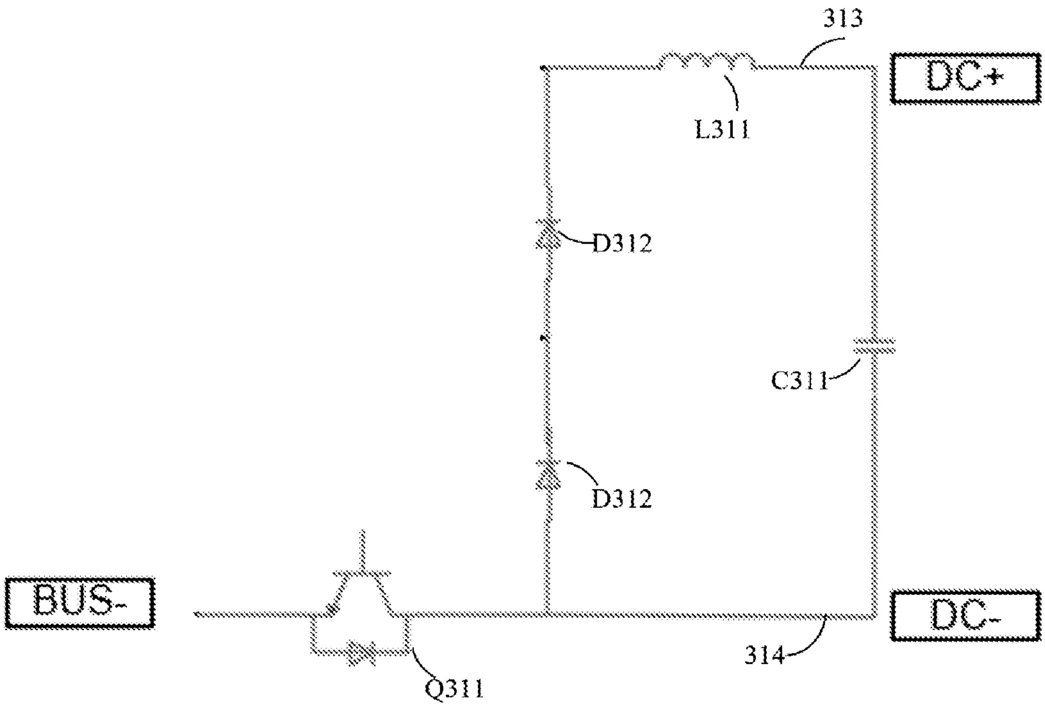

FIG. 6*a* and FIG. 6*b* are respectively schematic diagrams of equivalent circuits corresponding to a process in which the negative direct current bus stores energy in an inductor (FIG. 6*a*) and a process in which the inductor supplies power to positive and negative output terminals (FIG. 6*b*) in the foregoing negative half cycle according to Embodiment two.

In the negative half cycle (corresponding to the right side in FIG. 4), the negative direct current bus 312 supplies power, the switching transistor Q313 remains on, the switching transistor Q311 remains off, and the switching transistor Q312 performs pulse width modulation. When the switching transistor Q312 is turned on, the current direction is: the neutral point N→the switching transistor Q312→the diode D311→the inductor L311→the capacitor C311→the switching transistor Q313→the negative direct current bus 312. In this process, the negative direct current bus 312 stores energy in the inductor L311 and supplies power to the positive and negative output terminals 313, 314. When the switching transistor Q312 is turned off, the current direction is: the inductor L311→the capacitor C311→the diode D312→the diode D311→the inductor L311, where the inductor L311 supplies power between the positive and negative output terminals 313, 314.

In summary, in the positive half cycle, the negative output terminal 314 remains connected to the neutral point N by the diode D312 and the switching transistor Q312, and the level of the negative output terminal 314 is equivalent to that of the neutral point N. In the negative half cycle, the negative output terminal 314 remains connected to the negative direct current bus 312 by the switching transistor Q313. Therefore, the level of the negative output terminal 314 is equivalent to that of the negative direct current bus 312. Because a switching frequency of the positive and negative half cycles of the charging circuit 31 is an operating frequency, and is basically consistent with or in the same order of magnitude as an alternating current frequency, the switching frequency is greatly reduced relative to a pulse width modulation frequency of the switching transistors.

Figure 1:
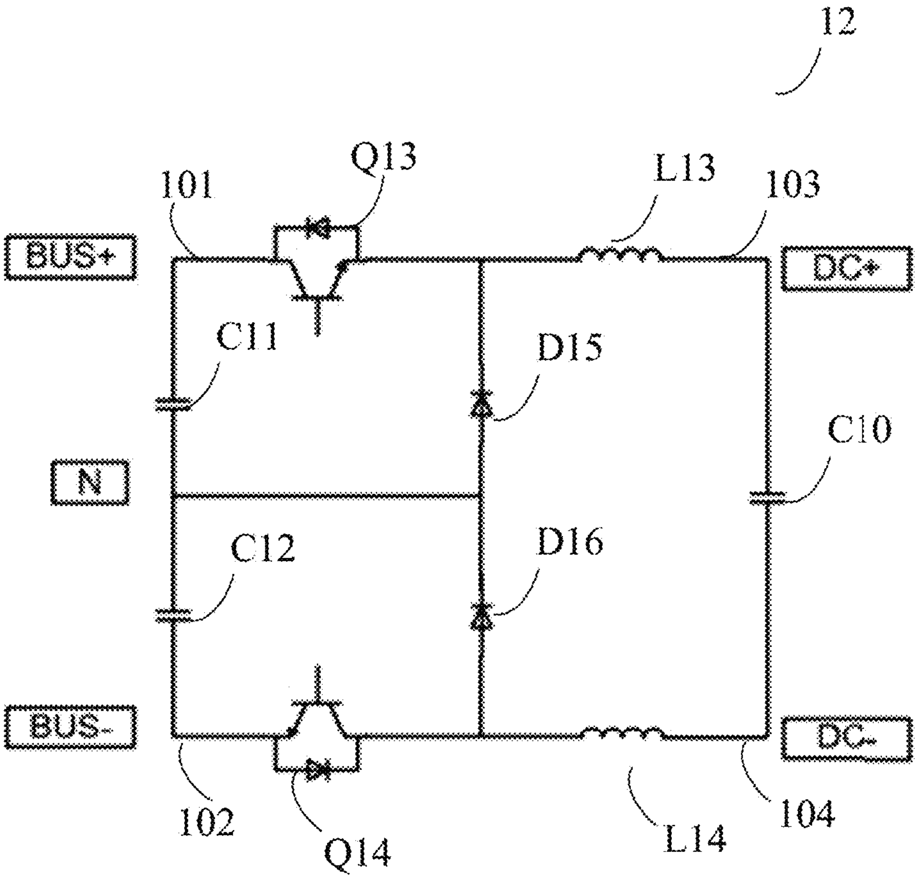
Prior Art Fig.1
FIG. 1 shows a dual-bus alternate buck charging circuit in the prior art.
Figure 2:
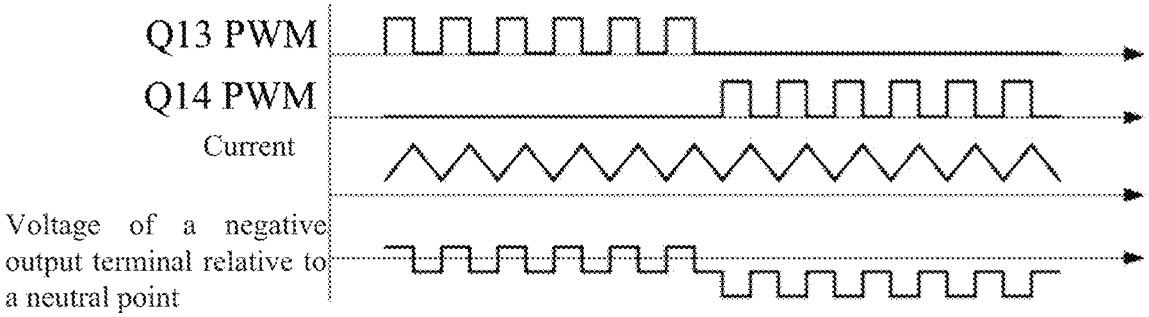
Prior Art Fig.2
FIG. 2 is a schematic diagram of a pulse width modulation control signal received by gates of Q13 and Q14, corresponding current waveforms, and jumps of a potential of the negative output terminal 104 relative to the neutral point when the dual buses of the charging circuit shown in FIG. 1 alternately perform charging.

Therefore, the level of the negative output terminal 314 is also switched between the level of the neutral point N and the level of the negative direct current bus 312 at the lower operating frequency. Because a voltage difference between positive and negative output terminals is constant, during charging of the battery, a level of the negative electrode of the battery is also only switched between the level of the negative direct current bus 312 and the level of the neutral point N at the operating frequency of switching between the positive and negative half cycles, and the positive electrode of the battery is also switched at a similar level difference and a similar frequency. In this way, the charging circuit 31 has a better electromagnetic compatibility characteristic, especially compared with the prior art shown in FIG. 1. In addition, because the number of inductors is reduced to one in the charging circuit 31, the costs are reduced, and the size is reduced.

In another aspect, because the charging circuit 31 uses a circuit topology in which single sides of positive and negative direct current buses alternately supply energy, compared with a circuit topology in which two sides of the positive and negative direct current buses simultaneously supply energy to the battery in the prior art, the charging circuit 31 is more appropriate for an uninterruptible power supply with a single-phase alternating current input, a voltage difference between an input and an output of a buck circuit is reduced, and charging efficiency is higher.

Embodiment Three

Figure 7:
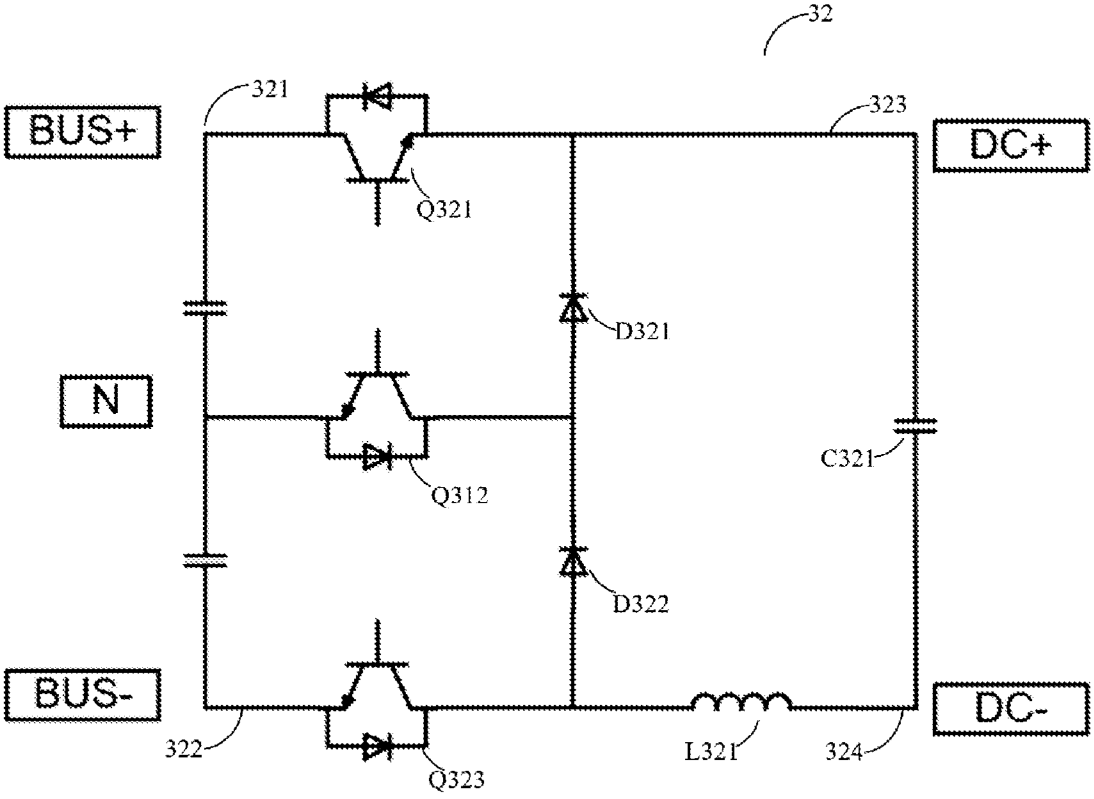
FIG. 7 shows another variant of the charging circuit in FIG. 3.

FIG. 7 shows another variant of the charging circuit in FIG. 3. Differences between a charging circuit 32 shown in FIG. 7 and the charging circuit 31 shown in FIG. 3 lie in that the inductor L311 is arranged between the negative direct current bus and the negative output terminal, and the emitter and the collector of the switching transistor Q312 connected to the neutral point are interchanged. Therefore, the circuit principle of the charging circuit 32 is basically consistent with that of the charging circuit shown in FIG. 3. The technical effects are also basically consistent.

Figure 8:
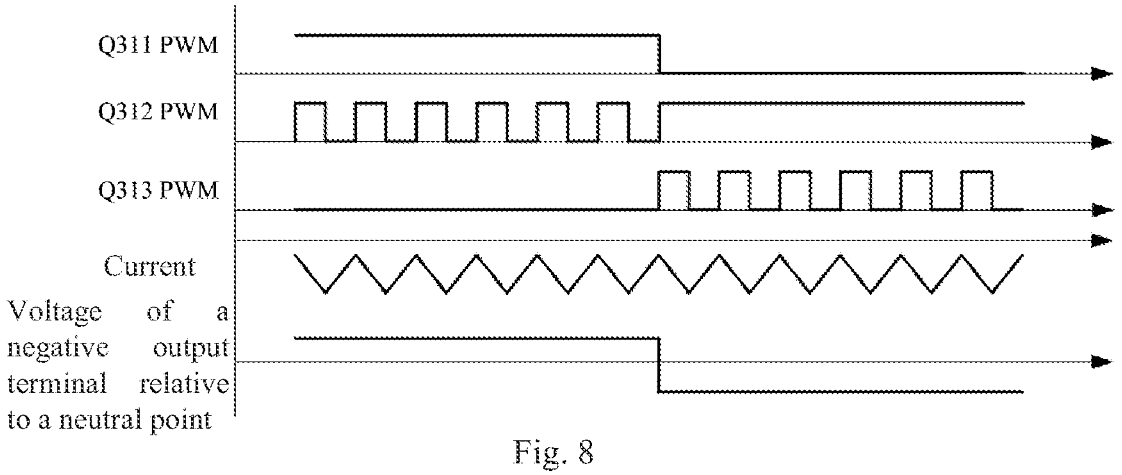
FIG. 8 is a schematic diagram of control signals and current and voltage waveforms in a power supply cycle of a positive direct current bus (a positive half cycle) and a power supply cycle of a negative direct current bus (a negative half cycle) of the charging circuit in FIG. 7.

FIG. 8 is a schematic diagram of control signals and current and voltage waveforms in a power supply cycle of a positive direct current bus (a positive half cycle) and a power supply cycle of a negative direct current bus (a negative half cycle) of the charging circuit 32 in FIG. 7. Control signals outputted by a control module to gates of the switching transistor Q321, the switching transistor Q322, and the switching transistor Q323, current flowing in a loop (for example, on the inductor L321), and a level of a negative output terminal 324 relative to the neutral point N are specifically shown.

Figure 9A:
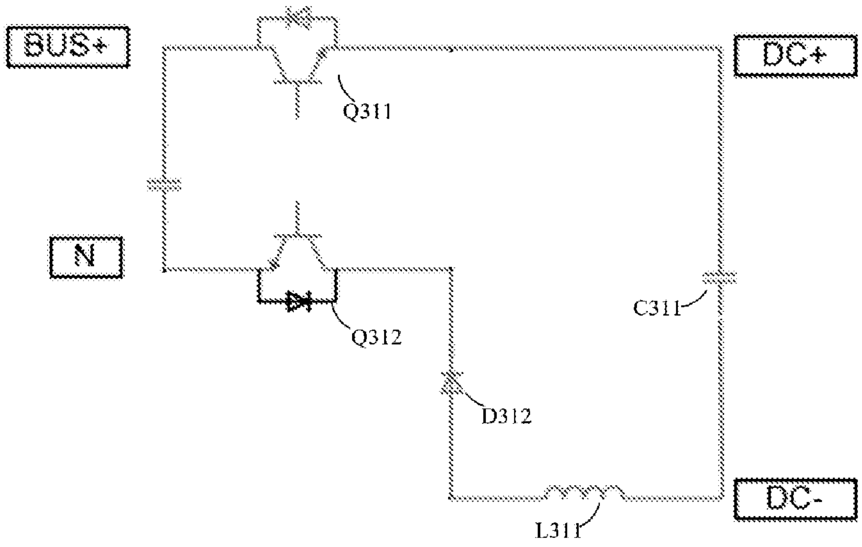
FIG. 9*a* and FIG. 9*b* are diagrams of equivalent circuits of the charging circuit in FIG. 7 in the positive half cycle.
Figure 9B:
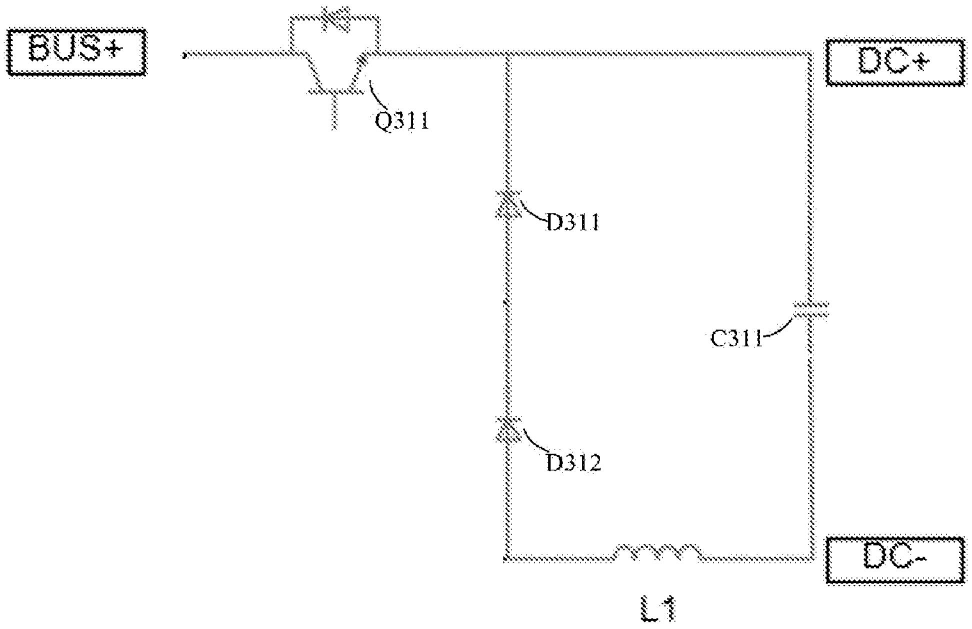

FIG. 9*a* and FIG. 9*b* are diagrams of equivalent circuits of the charging circuit 32 in FIG. 7 in the positive half cycle. In the positive half cycle, the switching transistor Q321 remains on, the switching transistor Q323 remains off, and the switching transistor Q322 performs pulse width modulation. When Q322 is turned on, the current direction is: a positive direct current bus 321→the switching transistor Q321→a capacitor C321→the inductor L321→a diode D322→the switching transistor Q322→the neutral point N. In this process, the positive direct current bus 321 stores energy in the inductor L321 and supplies power to a positive output terminal 323 and the negative output terminal 324. When the switching transistor Q322 is turned off, the inductor L321 is freewheeling and discharging, the current direction is: the inductor L321→the diode D322→a diode D321→the capacitor C321→the inductor L321, where the inductor L321 supplies power between the positive and negative output terminals 323, 324.

Figure 10A:
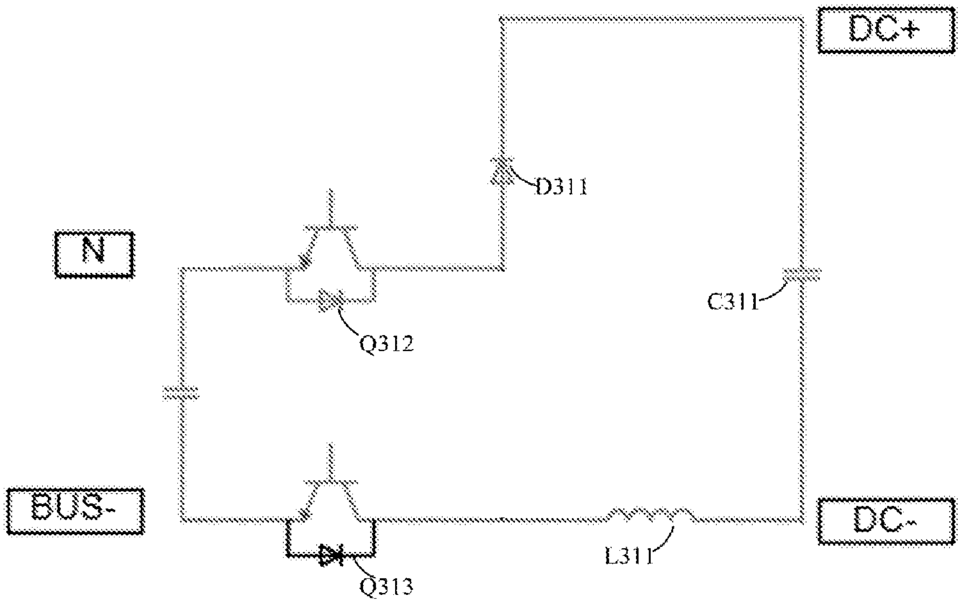
FIG. 10*a* and FIG. 10*b* are diagrams of equivalent circuits of the charging circuit in FIG. 7 in the negative half cycle.
Figure 10B:
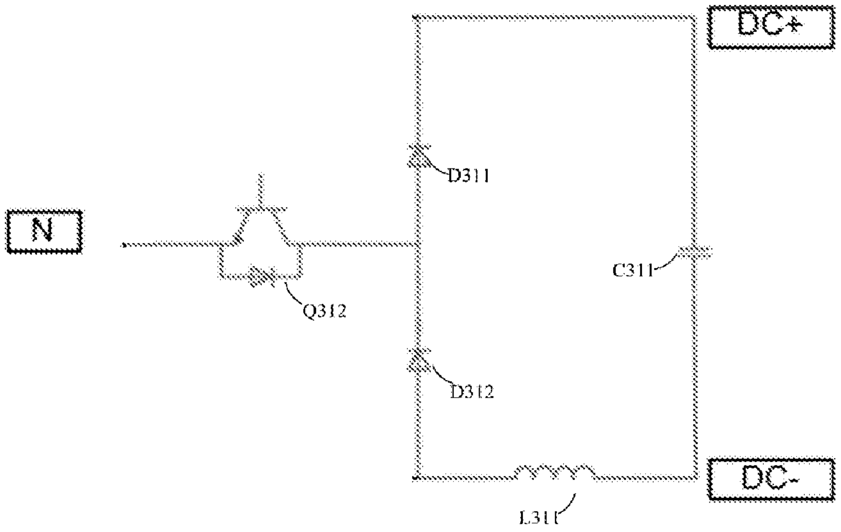

FIG. 10*a* and FIG. 10*b* are diagrams of equivalent circuits of the charging circuit 32 in FIG. 7 in the negative half cycle. In the negative half cycle, the switching transistor Q322 remains on, the switching transistor Q321 remains off, and the switching transistor Q323 performs pulse width modulation. When the switching transistor Q323 is turned on, the current direction is: the neutral point N→the switching transistor Q322→the diode D321→the capacitor C321→the inductor L321→the switching transistor Q323→a negative direct current bus 322. In this process, the negative direct current bus 322 stores energy in the inductor L321 and supplies power to the positive and negative output terminals 323, 324. When the switching transistor Q323 is turned off, the current direction is: the inductor L321→the diode D322→the diode D321→the capacitor C321→the inductor L321, where the inductor L321 supplies power to the positive and negative output terminals 323, 324.

In summary, in the positive half cycle, the positive output terminal 323 remains connected to the positive direct current bus 321 by the switching transistor Q321. A level of the positive output terminal 323 is equivalent to that of the positive direct current bus 321. In the negative half cycle, the positive output terminal 323 is connected to the neutral point N by the switching transistors Q322 and the diode D321. A level of the positive output terminal 323 is equivalent to that of the neutral point N. Because a voltage difference between positive and negative output terminals is constant, during charging, a level of the positive electrode of the battery is only switched between the level of the positive direct current bus 321 and the level of the neutral point N at the operating frequency of switching between the positive and negative half cycles, and the negative electrode of the battery is also switched at a similar level difference and a similar frequency. In this way, the charging circuit 31 has a better electromagnetic compatibility characteristic.

Embodiment Four

Figure 11:
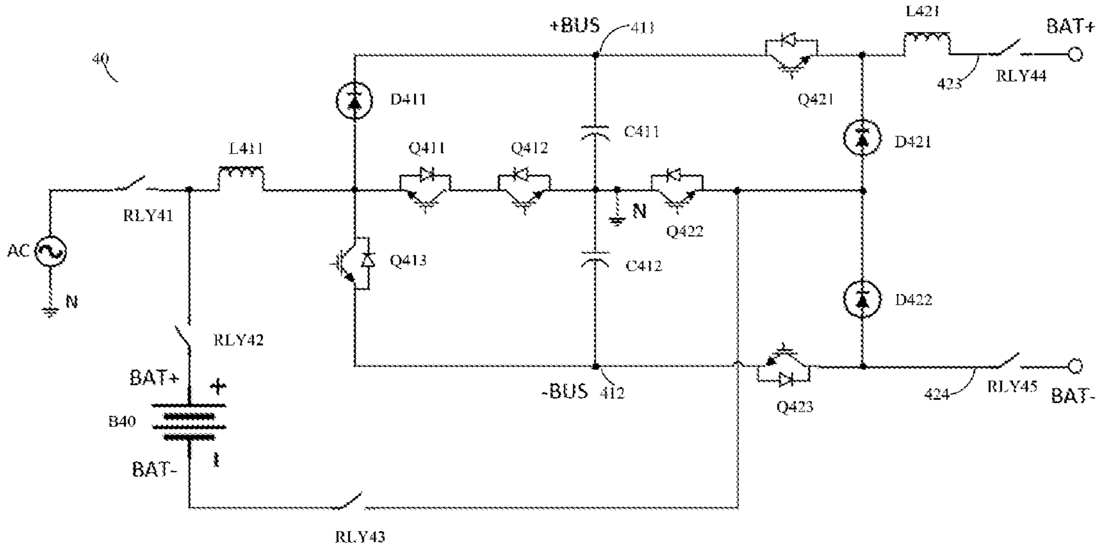
FIG. 11 is a schematic circuit diagram of a current conversion circuit of a single-battery uninterruptible power supply according to another preferred embodiment of the present invention.

FIG. 11 is a schematic circuit diagram of a multiplexing current conversion circuit (current converter) of a single-battery uninterruptible power supply according to another preferred embodiment of the present invention.

FIG. 11 shows a multiplexing current conversion circuit 40 in Embodiment four, including a PFC and DC-DC multiplexing circuit and a charging circuit 42. A multiplexing part also exists in partial circuits of the PFC and DC-DC multiplexing circuit and the charging circuit 42.

The PFC and DC-DC multiplexing circuit includes an inductor L411, a switching transistor Q411 and a switching transistor Q412 (connected in reverse series with the switching transistor Q411) which are connected in series in sequence, as well as a diode D411, a switching transistor Q413, and direct current bus capacitors C411 and C412.

One terminal of the inductor L411 is connected to an emitter of the switching transistor Q411, and the other terminal of the inductor L411 is connected to single-phase alternating current AC by an alternating current switch RLY41 and is connected to a positive electrode of battery B40 by a direct current switch RLY42. A node formed by a connection between the direct current bus capacitors C411 and C412 is connected to a neutral point N.

A collector of the switching transistor Q411 is connected to a collector of the switching transistor Q412, an emitter of the switching transistor Q412 is connected to a node formed by a connection between one terminal of the direct current bus capacitor C411 and one terminal of the direct current bus capacitor C412 and is connected to the neutral point N, the other terminal of the direct current bus capacitor C411 is connected to a positive direct current bus 411 used as an output, and the other terminal of the direct current bus capacitor C412 is connected to a negative direct current bus 412 used as another output.

A cathode of the diode D411 is connected to the positive direct current bus 411. An anode of the diode D411 is connected to a collector of the switching transistor Q413 to form a node, and the inductor L411 is connected to the emitter of the switching transistor Q411 by the node. An emitter of the switching transistor Q413 is connected to the negative direct current bus 412.

The PFC and DC-DC multiplexing circuit further includes a switching transistor Q422. A collector of the switching transistor Q422 is connected to the neutral point N, and an emitter of the switching transistor Q422 is connected to a negative electrode of the battery B40.

The charging circuit 42 according to the present invention shown in FIG. 11 has a structure and an operating mode similar to those of the charging circuit 31 described in Embodiment one. The charging circuit 42 includes a switching transistor Q421, the switching transistor Q422 (as discussed above, the switching transistor Q422 is also used as an element of the PFC and DC-DC multiplexing circuit), a switching transistor Q423, a diode D421, a diode D422, and an inductor L421.

The switching transistor Q421 and the inductor L421 are connected in series for use as a positive side arm. An emitter of the switching transistor Q421 is connected to one terminal of the inductor L421, a collector of the switching transistor Q421 is connected to the positive direct current bus 411, and the other terminal of the inductor L421 is connected to the positive output terminal 423 and is connected to a direct current switch RLY44. The positive output terminal 423 is connected to the positive electrode of the battery B40 by the direct current switch RLY44 to charge the battery B40. The switching transistor Q423 is connected in series between the negative direct current bus 412 and a negative output terminal 424 for use as a negative side arm. An emitter of the switching transistor Q423 is connected to the negative direct current bus 412, and a collector of the switching transistor Q423 is connected to the negative output terminal 424 and is connected to a direct current switch RLY45. The negative output terminal 424 is connected to the negative electrode of the battery B40 by the direct current switch RLY45 to charge the battery B40. The switching transistor Q422 is used in the PFC and DC-DC multiplexing circuit, and is also used as a part of a middle bridge arm in the charging circuit 42. The collector of the switching transistor Q422 is connected to the neutral point N as discussed above, and the emitter of the switching transistor Q422 is further connected to a node formed between the two diodes D421 and D422 that are connected in forward series. An anode of the diode D421 is connected to a cathode of the diode D422, a cathode of the diode D421 is connected to a node formed by a connection between the emitter of the switching transistor Q421 and a terminal of the inductor L311, and an anode of the diode D422 is connected to a node between a collector of the switching transistor Q423 and the direct current switch RLY45. Although not shown in FIG. 11, at least one capacitor may further be connected in series between the positive output terminal 423 and the negative output terminal 424.

The function and arrangement position of the capacitor are similar to those of the capacitor C311 in FIG. 3 and the capacitor C321 in FIG. 7.

The switching transistors in this embodiment are all exemplarily shown as insulated gate bipolar transistors connected with a diode in reverse parallel, but may be alternatively other appropriate transistors connected with a diode in reverse parallel.

An operating mode of the multiplexing current conversion circuit 40 is described below in detail.

Utility Power Mode

For Embodiment four, when single-phase alternating current power supply AC inputted from utility power is normal, the utility power supplies power to a load. In this case, the alternating current switch RLY41, the direct current switch RLY44, and the direct current switch RLY45 are turned off, and the direct current switches RLY42, RLY43 are turned on.

In the utility power mode, the PFC and DC-DC multiplexing circuit 41 rectifies alternating current into direct current and supplies the direct current to the positive and negative direct current buses, and can charge the single battery B40 through the charging circuit 42 using direct current power of the positive and negative direct current buses. The positive output terminal 423 of the charging circuit 42 is connected to the positive electrode of the battery B40 by the direct current switch RLY44, and the negative output terminal 424 of the charging circuit 42 is connected to the negative electrode of the battery B40 by the direct current switch RLY45.

Figure 12A:
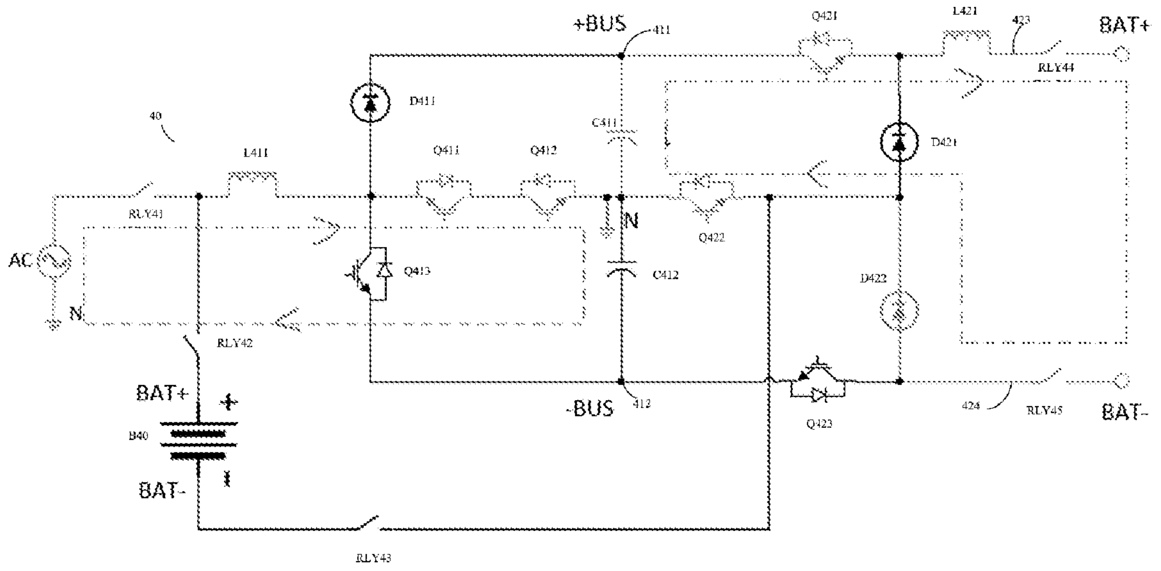
FIG. 12*a* and FIG. 12*b* are schematic diagrams of current directions in a positive half cycle of the current conversion circuit in FIG. 11 in a utility power mode.
Figure 12B:
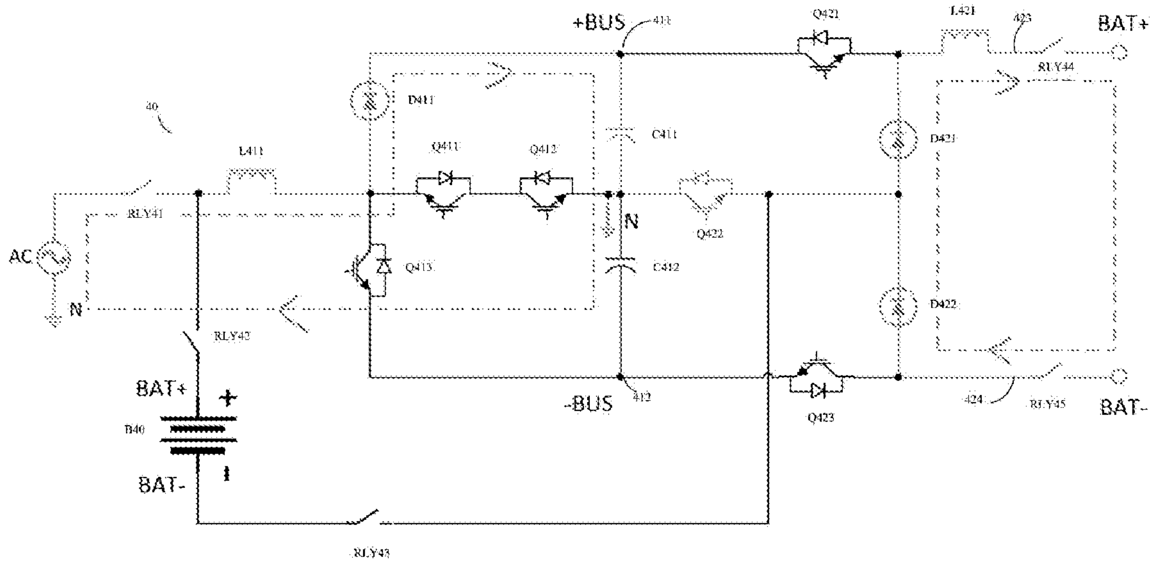

FIG. 12*a* and FIG. 12*b* are schematic diagrams of current directions in a positive half cycle of the current conversion circuit 40 in a utility power mode. In FIG. 12*a*, two dotted boxes with arrows are used to indicate flowing directions of current. Similarly, dotted boxes with arrows in FIG. 12*b* to FIG. 15*b* below are all used to represent current directions in circuits.

In the positive half cycle of utility power, the switching transistor Q413 of the circuit 41 remains off, the switching transistor Q411 remains on, and the switching transistor Q412 performs pulse width modulation. The switching transistor Q423 of the circuit 42 remains off, the switching transistor Q422 remains on, and the switching transistor Q421 performs pulse width modulation.

As shown in FIG. 12*a*, when the switching transistor Q412 is turned on, a current direction in the circuit 41 is: the AC power supply→the inductor L411→the switching transistor Q411→the switching transistor Q412→the neutral point N, where the inductor L411 stores energy.

When the switching transistor Q421 is turned on, the positive direct current bus 411 in the circuit 42 supplies power to the charging circuit 42. The current direction is: the positive direct current bus 411→the switching transistor Q421→the inductor L421→the positive output terminal 423→the positive electrode of the battery B40→the negative electrode of the battery B40→the diode D422→the switching transistor Q422→the neutral point N, where the inductor L421 stores energy.

As shown in FIG. 12*b*, when the switching transistor Q412 is turned off, the current direction in the circuit 41 is: the AC power supply→the inductor L411→the diode D411→the capacitor C411→the neutral point N. The AC power supply and the inductor L411 are connected in series to boost voltage and supply power to the positive direct current bus 411.

When the switching transistor Q421 is turned off, the inductor L421 in the circuit 42 supplies freewheeling power to the charging circuit 42, and the current direction is: the inductor L421→the positive output terminal 423→the positive electrode of the battery B40→the negative electrode of the battery B40→the diode D422→the diode D421→the inductor L421.

In the positive half cycle, a potential of the negative output terminal 423 (a potential of the negative electrode of the battery B40) remains a potential of the neutral point N, there is no high frequency jump, and an electromagnetic compatibility characteristic is excellent.

Figure 13A:
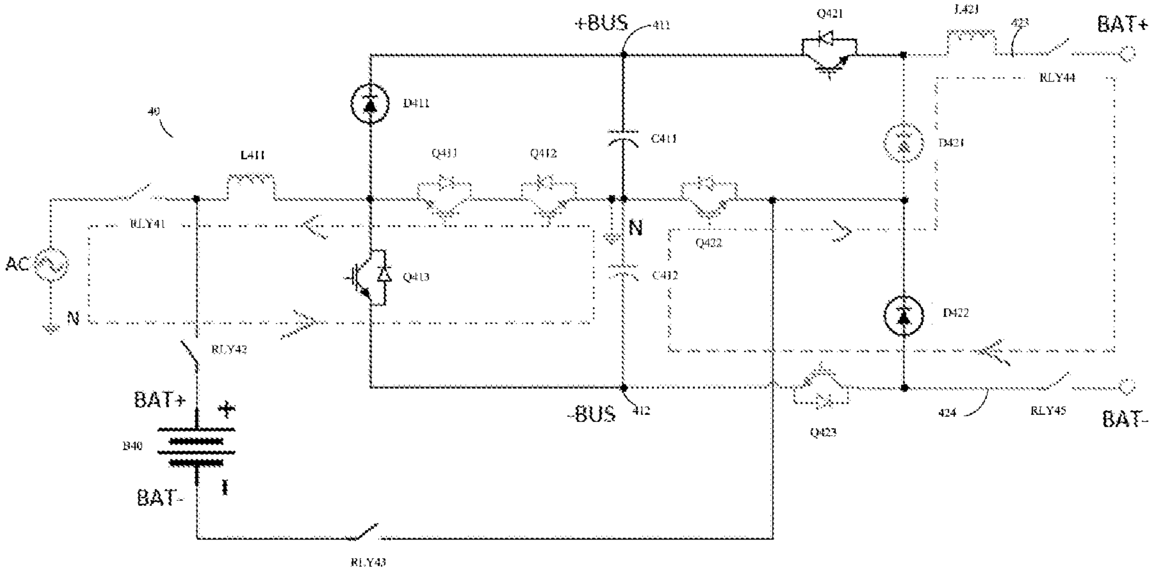
FIG. 13*a* and FIG. 13*b* are schematic diagrams of current directions in a negative half cycle of the current conversion circuit in FIG. 11 in the utility power mode.
Figure 13B:
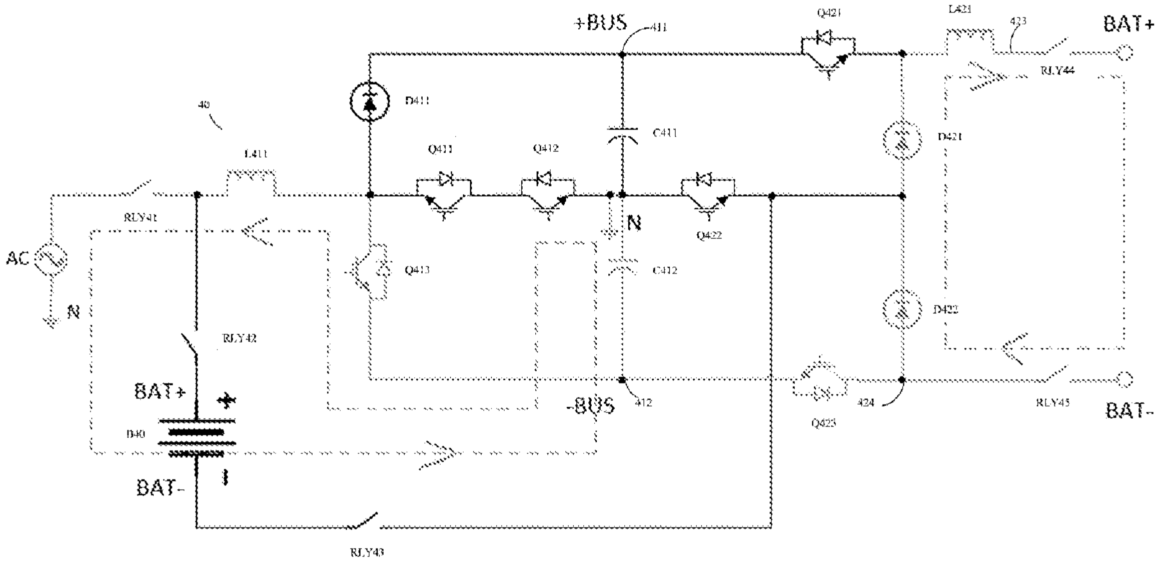

FIG. 13*a* and FIG. 13*b* are schematic diagrams of current directions in a negative half cycle of the multiplexing current conversion circuit in FIG. 11 in the utility power mode. For Embodiment four, in the negative half cycle of utility power, the switching transistor Q413 of the circuit 41 remains off, the switching transistor Q412 remains on, and the switching transistor Q411 performs pulse width modulation. The switching transistor Q421 of the circuit 42 remains off, the switching transistor Q423 remains on, and the switching transistor Q422 performs pulse width modulation.

As shown in FIG. 13*a*, when the switching transistor Q411 is turned on, the current direction in the circuit 41 is: the neutral point N→the switching transistor Q412→the switching transistor Q411→the inductor L411→the AC power supply→the neutral point N, where the inductor L411 stores energy.

When the switching transistor Q422 is turned on, the negative direct current bus 412 in the circuit 42 supplies power to the charging circuit 42, and the current direction is: the neutral point N→the switching transistor Q422→the diode D421→the inductor L421→the positive output terminal 423→the positive electrode of the battery B40→the negative electrode of the battery B40→the switching transistor Q423→the negative direct current bus 412, where the inductor L421 stores energy.

As shown in FIG. 13*b*, when the switching transistor Q411 is turned off, the current direction in the circuit 41 is: the neutral point N→capacitor C412→the negative direct current bus 412→the switching transistor Q413→the inductor L411→the AC power supply→the neutral point N. The AC power supply and the inductor L411 are connected in series to boost voltage and supply power to the negative direct current bus 412.

When the switching transistor Q422 is turned off, the inductor L421 in the circuit 42 supplies freewheeling power to the charging circuit 42, and the current direction is: the inductor L421→the positive output terminal 423→the positive electrode of the battery B40→the negative electrode of the battery B40→the diode D422→the diode D421→the inductor L421.

Similar to the technical effects of the positive half cycle, in the negative half cycle, the potential of the negative output terminal 423 (the potential of the negative electrode of the battery B40) remains the potential of the negative direct current bus 412, there is no high frequency jump, and the electromagnetic compatibility characteristic is excellent.

Battery Mode

For the current conversion circuit 40 in Embodiment four shown in FIG. 11, when a utility power input fails, a control module of the uninterruptible power supply controls the uninterruptible power supply to switch from utility power to supply of power to the load by a single battery. In this case, the alternating current switch RLY41, the direct current switch RLY44, and the direct current switch RLY45 are opened (turned off), and the direct current switches RLY42, RLY43 are closed (turned on).

In the battery mode, the PFC and DC-DC multiplexing circuit 41 boosts voltage of direct current supplied by the battery B40 and provides the direct current to the positive and negative direct current buses to output power externally (for example, to a DC-AC module).

In the positive half cycle, the switching transistor Q413 remains off, the switching transistor Q411 and the switching transistor Q422 remain on, and the switching transistor Q412 performs pulse width modulation; and the switching transistor Q421 and the switching transistor Q423 remain off.

Figure 14A:
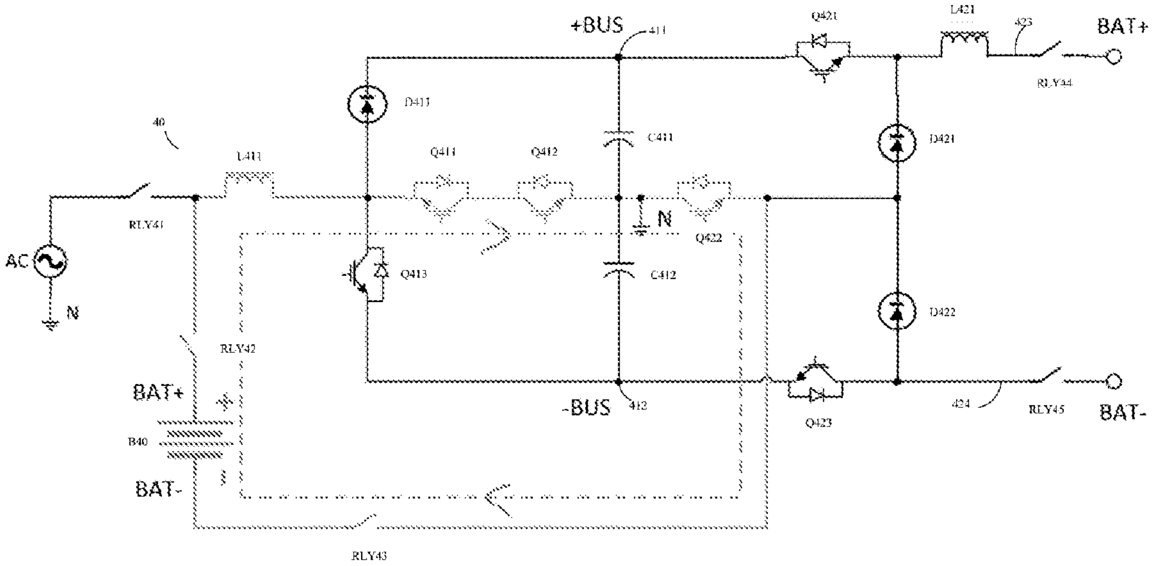
FIG. 14*a* and FIG. 14*b* are respectively schematic diagrams of equivalent circuits corresponding to a process in which energy is stored in an inductor (FIG. 14*a*) and a process in which the inductor and a battery supply power to a positive direct current bus (FIG. 14*b*) in a positive half cycle of a battery mode of a current conversion circuit 40 in FIG. 11.
Figure 14B:
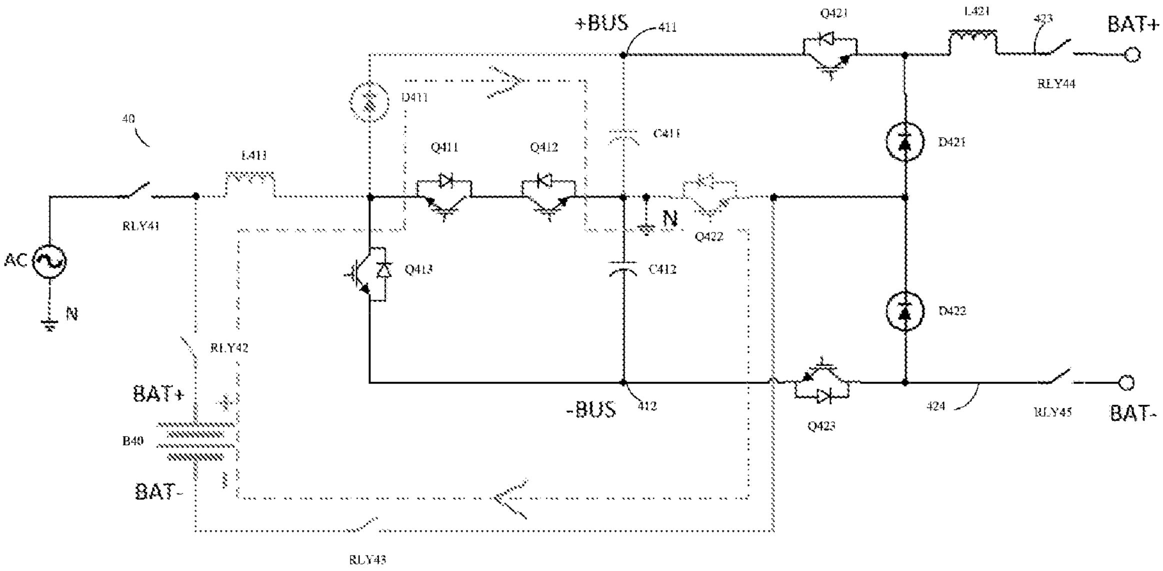

FIG. 14*a* and FIG. 14*b* are respectively schematic diagrams of equivalent circuits corresponding to a process in which energy is stored in an inductor (FIG. 14*a*) and a process in which the inductor and a battery supply power to a positive direct current bus (FIG. 14*b*) in a positive half cycle of a battery mode of a current conversion circuit 40 in FIG. 11;

FIG. 14*a* is a schematic diagram of a current direction of a process in which energy is stored in an inductor in a positive half cycle of the current conversion circuit 40 in a battery mode. When the switching transistor Q412 is turned on, the current direction is: the positive electrode of the battery B40→the inductor L411→the switching transistor Q411→the switching transistor Q412→the switching transistor Q422→the negative electrode of the battery B40, where the inductor L411 is charged.

FIG. 14*b* is a schematic diagram of a current direction of a process in which an inductor and a battery boost voltage and supply power to a positive direct current bus in a positive half cycle of the current conversion circuit 40 in a battery mode. When the switching transistor Q412 is turned off, the current direction is: the positive electrode of the battery B40→the inductor L411→the diode D411→the positive direct current bus 411→the capacitor C411→the switching transistor Q422→the negative electrode of the battery B40. The inductor L411 and the battery B40 are connected in series to boost voltage and supply power to the positive direct current bus 411. In the positive half cycle, the potential of the negative electrode of the battery B40 remains the potential of the neutral point N, there is no high frequency jump, and the electromagnetic compatibility characteristic is excellent.

Figure 15A:
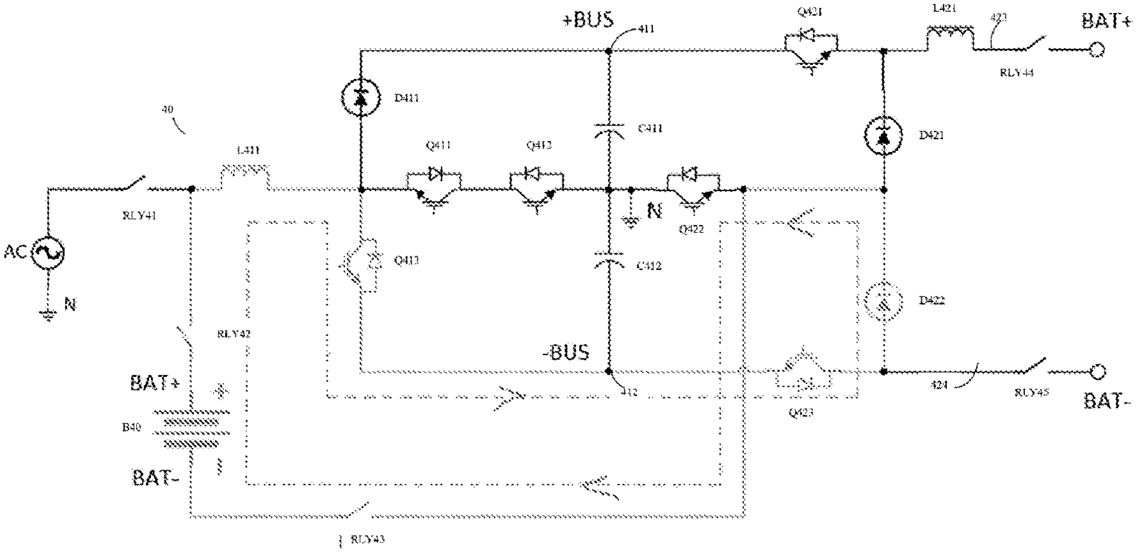
FIG. 15*a* and FIG. 15*b* are respectively schematic diagrams of equivalent circuits corresponding to a process in which energy is stored in an inductor (FIG. 15*a*) and a process in which the inductor and a battery supply power to a positive direct current bus (FIG. 15*b*) in a negative half cycle of a battery mode of a current conversion circuit 40 in FIG. 11.
Figure 15B:
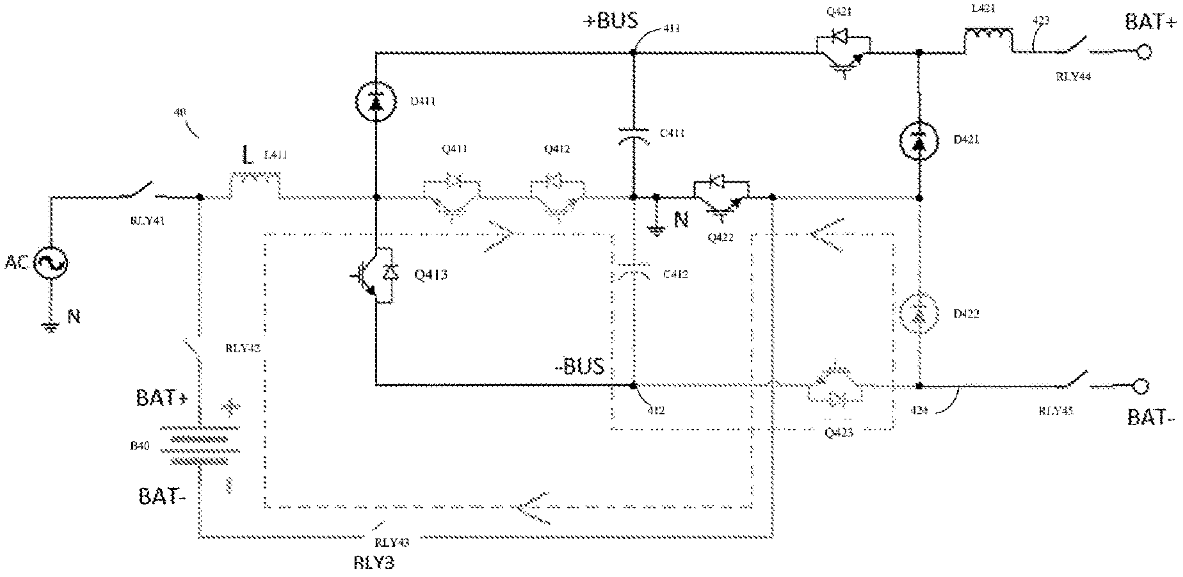

FIG. 15*a* and FIG. 15*b* are respectively schematic diagrams of equivalent circuits corresponding to a process in which energy is stored in an inductor (FIG. 15*a*) and a process in which the inductor and a battery supply power to a positive direct current bus (FIG. 15*b*) in a negative half cycle of a battery mode of a current conversion circuit 40 in FIG. 11.

In the negative half cycle, the switching transistor Q411 and the switching transistor Q422 remain off, the switching transistor Q412 remains on, and the switching transistor Q413 performs pulse width modulation; and the switching transistor Q421 remains off, and the switching transistor Q423 remains on.

FIG. 15*a* is a schematic diagram of a current direction of a process in which energy is stored in an inductor in a negative half cycle of the current conversion circuit 40 in a battery mode. When the switching transistor Q413 is turned on, the current direction is: the positive electrode of the battery B40→the inductor L411→the switching transistor Q413→the negative direct current bus 412→the switching transistor Q423→the diode D422→the negative electrode of the battery B40, where the inductor L411 stores energy.

FIG. 15*b* is a schematic diagram of a current direction of a process in which an inductor and a battery boost voltage and supply power to a negative direct current bus in a negative half cycle of the current conversion circuit 40 in a battery mode. When the switching transistor Q413 is turned off, the current direction is: the positive electrode of the battery B40→the inductor L411→the switching transistor Q411→the switching transistor Q412→the capacitor C412→the negative direct current bus 412→the switching transistor Q423→the diode D422→the negative electrode of the battery B40. The inductor L411 and the battery B40 are connected in series to boost voltage and supply power to the negative direct current bus 412. In the entire negative half cycle process, the potential of the negative electrode of the battery B40 remains the potential of the negative direct current bus 412, and there is no high frequency jump.

Therefore, in a charging process (the utility power mode) and a discharging process (the battery mode) of the single battery B40, neither of the potentials of the positive electrode and negative electrode of the battery B40 has high frequency jumps (a voltage between the positive electrode and negative electrode of the battery B40 is constant), thereby resolving a disadvantage of a significantly low electromagnetic compatibility characteristic after a single battery is hooked up in a dual BOOST circuit in the prior art, so that technical effects are excellent.

In addition, as can be seen from the foregoing description, the switching transistor Q422 is a power device in a battery hookup bridge arm unit of the PFC and DC-DC multiplexing circuit 41, and is also a power device in a middle arm of the charging circuit 42 (for example, similar to a switching transistor Q312 in FIG. 3). Similarly, the switching transistor Q423 and the diode D422 connected in series are used as a power device in the battery hookup bridge arm unit between the negative direct current bus and the negative electrode of the battery in the multiplexing circuit 41 in the battery mode, and are also used as a power device in the charging circuit 42. For example, the switching transistor Q423 is used as a power device of the negative side arm of the charging circuit 42. Therefore, the current conversion circuit 40 forms a highly multiplexing circuit of the PFC and DC-DC multiplexing circuit 41 and the charging circuit 42, which has less power switch elements, higher level of integration, and lower costs.

Figure 16:
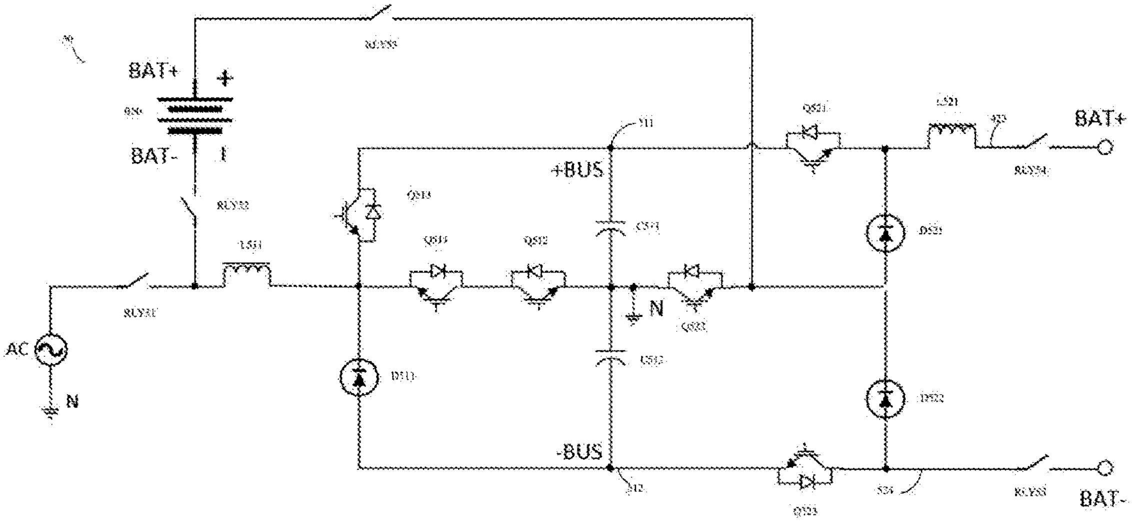
FIG. 16 to FIG. 18 show other variants of the current conversion circuit 40 in FIG. 11.
Figure 17:
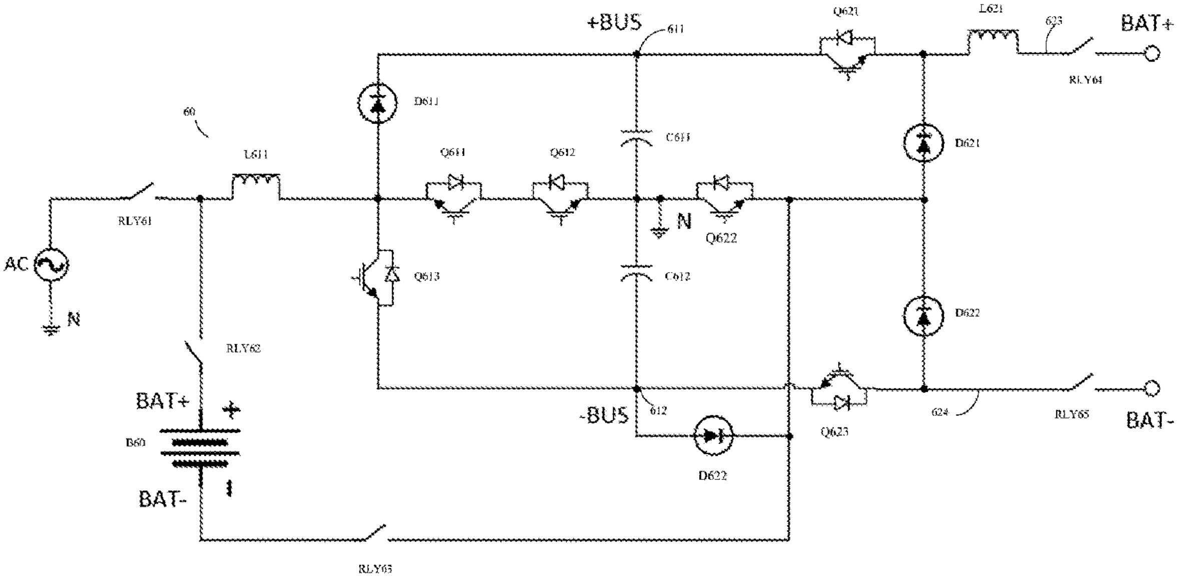
Figure 18:
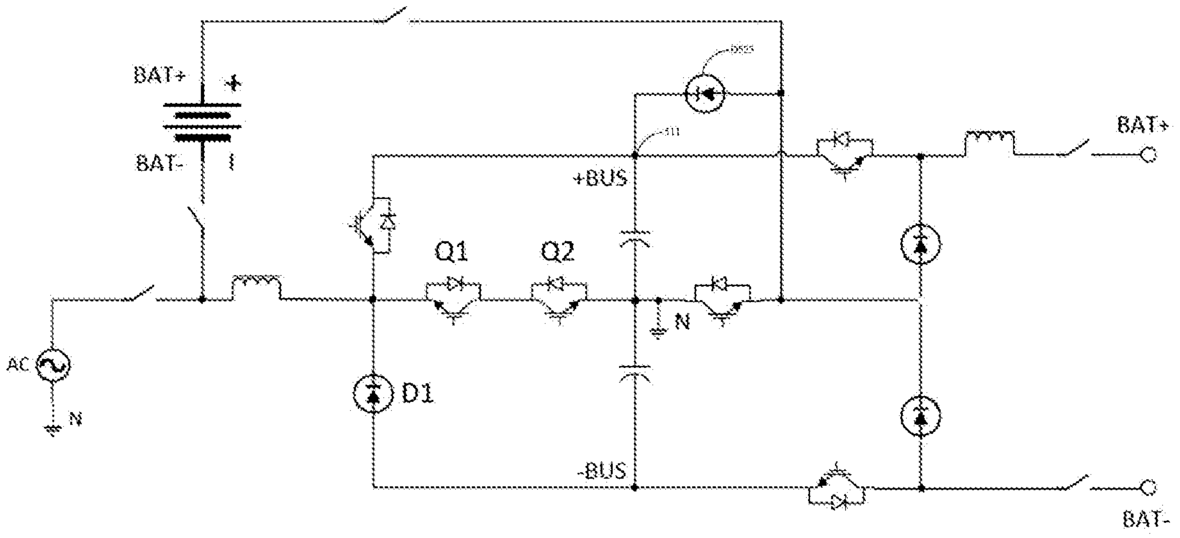

FIG. 16 to FIG. 18 show other variants of the current conversion circuit 40 in FIG. 11.

FIG. 16 shows a current conversion circuit 50 in which a battery hookup position is mirrored from a negative direct current bus to a side of a positive direct current bus. A positive electrode of a battery B50 is connected to an emitter of a switching transistor Q522, and a negative electrode of the battery B50 is connected between an inductor L511 and an alternating current switch RLY51. A switching transistor is arranged between the inductor L511 and a positive direct current bus 511, and a diode is arranged between the inductor L511 and the positive direct current bus 511. The control logic and technical effects of the current conversion circuit 50 are similar to those of the current conversion circuit 40.

FIG. 17 shows a current conversion circuit 60 that is another variant of the current conversion circuit 40. A diode D623 is added between a negative direct current bus 612 and the negative electrode of the battery, so that the circuit can be better applied to a scenario in which power that needs to be designed for a charging circuit is low.

FIG. 18 shows another variant of the current conversion circuit 40. In the variant, it may be considered that a diode D523 is added between the positive direct current bus 511 of the current conversion circuit 50 and the positive electrode of the battery, so that the circuit can be better applied to a scenario in which power that needs to be designed for a charging circuit is low.

Although not shown in FIG. 16 to FIG. 18, at least one capacitor may be further connected in series between the positive output terminal and the negative output terminal of the current conversion circuit. The function and arrangement position of the capacitor are similar to those of the capacitor C311 in FIG. 3 and the capacitor C321 in FIG. 7.

In other variant embodiments according to the current conversion circuit, the PFC and DC-DC multiplexing converter has the following structure: when the battery hookup bridge arm is connected to the positive electrode of the battery and is powered by the battery, the battery hookup bridge arm alternately connects the positive electrode of the battery to the neutral point and the positive direct current bus; or when the battery hookup bridge arm is connected to the positive electrode of the battery and is powered by the battery, the positive electrode of the battery is directly connected to the neutral point.

The present invention further provides a single-battery uninterruptible power supply, including the current conversion circuit in the foregoing embodiments of the present invention.

Although a single-phase alternating current output is used as an example in the embodiments of this application, those having ordinary skill in the art may apply the current conversion circuit in the embodiments to a three-phase alternating current input without departing from the scope of protection of the present invention.

Although the switching transistors are shown in the embodiments of this application as insulated gate bipolar transistors connected with a diode in reverse parallel between a collector and an emitter, the switching transistors may be replaced with metal-oxide-semiconductor field effect transistors (MOSFETs) or thyristors connected with a diode in reverse parallel or other appropriate transistors connected with a diode in reverse parallel or other controllable electronic switches as required.

The positive and negative direct current buses to which the input terminal of the charger is connected according to the embodiments of the present invention further include two bus capacitors connected between the positive and negative direct current buses, as shown in the accompanying drawings of the specification. However, those having ordinary skill in the art may make changes thereto without departing from the scope of the present invention, for example, omit bus capacitors or arrange more bus capacitors, which does not depart from the scope of protection of the present invention.

Although the present invention has been described by way of preferred embodiments, the present invention is not limited to the embodiments described herein, but includes various changes as well as variations made without departing from the scope of the present invention.

What is claimed is:

1. A charger for a multiplexing current conversion circuit comprising a power factor correction (PFC) and DC-DC multiplexing converter, comprising:

a positive side arm connected between a positive direct current bus and a positive electrode of a battery and comprising a first switching transistor;

a negative side arm connected between a negative direct current bus and a negative electrode of the battery and comprising a second switching transistor;

a middle arm connected to a neutral point and comprising a third switching transistor; and a unidirectional conduction circuit connected among the positive side arm, the middle arm, and the negative side arm and configured to constrain current to flow from the negative side arm to the positive side arm and/or the middle arm, wherein one of the positive side arm and the negative side arm comprises a first inductor and wherein the charger is alternately powered by the positive and negative direct current buses to charge the battery, wherein the charger alternately connects one electrode of the positive electrode and the negative electrode of the battery to the neutral point and one of the positive and negative direct current buses that has the same polarity as the electrode;

wherein the PFC and DC-DC multiplexing converter comprises a multiplexing bridge arm, a battery hookup bridge arm, and a control module, wherein the multiplexing bridge arm comprises:

a second inductor, wherein a first terminal of the second inductor is selectively connected to utility power or the battery;

a fourth switching transistor and a fifth switching transistor connected in series between a second terminal of the second inductor and the neutral point;

a first capacitor connected between the positive direct current bus and the neutral point and a second capacitor connected between the neutral point and the negative direct current bus; and a third diode and a sixth switching transistor, wherein an anode of the third diode and a first terminal of the sixth switching transistor are connected in common to the second terminal of the second inductor, a cathode of the third diode is connected to the positive direct current bus, and a second terminal of the sixth switching transistor is connected to the negative direct current bus, wherein the battery hookup bridge arm is connected between the battery and the multiplexing bridge arm to control the battery to alternately supply power to the positive and negative direct current buses, wherein the middle arm of the charger and the battery hookup bridge arm of the PFC and DC-DC multiplexing converter are multiplexed;

wherein the control module is configured to control switching transistors or switches in the PFC and DC-DC multiplexing converter or the charger; and wherein the PFC and DC-DC multiplexing converter controls one electrode of the positive electrode and the negative electrode of the battery to be alternately connected to the neutral point and one of the positive and negative direct current buses that has the same polarity as the electrode, to enable a level of the electrode of the battery to synchronously and alternately rise or drop along with the alternate supply of power to the positive and negative direct current buses; or controls one electrode of the positive electrode and the negative electrode of the battery to be constantly connected to the neutral point.

2. A multiplexing current conversion circuit comprising a power factor correction (PFC) and DC-DC multiplexing converter and a charger, wherein the charger comprises:

a positive side arm connected between a positive direct current bus and a positive electrode of a battery and comprising a first switching device;

a negative side arm connected between a negative direct current bus and a negative electrode of the battery and comprising a second switching device;

a middle arm connected to a neutral point and comprising a third switching device; and a unidirectional conduction circuit connected among the positive side arm, the middle arm, and the negative side arm and configured to constrain current to flow from the negative side arm to the positive side arm and/or the middle arm, wherein one of the positive side arm and the negative side arm comprises a first inductor and wherein the charger is alternately powered by the positive and negative direct current buses to charge the battery, wherein the charger alternately connects one electrode of the positive electrode and the negative electrode of the battery to the neutral point and one of the positive and negative direct current buses that has the same polarity as the electrode;

wherein the first switching device is a first switching transistor, the second switching device is a second switching transistor, the third switching device is a third switching transistor, and the unidirectional conduction circuit comprises a first diode and a second diode connected in series;

wherein a first terminal of the positive side arm is connected to the positive direct current bus, a second terminal of the positive side arm is connected to the positive electrode of the battery, a first terminal of the negative side arm is connected to the negative direct current bus, and a second terminal of the negative side arm is connected to the negative electrode of the battery;

wherein the PFC and DC-DC multiplexing converter comprises a multiplexing bridge arm, a battery hookup bridge arm, and a control module, wherein the multiplexing bridge arm comprises:

a second inductor, wherein a first terminal of the second inductor is selectively connected to utility power or the battery;

a fourth switching transistor and a fifth switching transistor connected in series between a second terminal of the second inductor and the neutral point;

a first capacitor connected between the positive direct current bus and the neutral point and a second capacitor connected between the neutral point and the negative direct current bus; and a third diode and a sixth switching transistor, wherein an anode of the third diode and a first terminal of the sixth switching transistor are connected in common to the second terminal of the second inductor, a cathode of the third diode is connected to the positive direct current bus, and a second terminal of the sixth switching transistor is connected to the negative direct current bus, wherein the battery hookup bridge arm is connected between the battery and the multiplexing bridge arm to control the battery to alternately supply power to the positive and negative direct current buses, wherein the middle bridge-arm of the charger and the battery hookup bridge arm of the PFC and DC-DC multiplexing converter are multiplexed;

wherein the control module is configured to control switching transistors or switches in the PFC and DC-DC multiplexing converter or the charger; and wherein the PFC and DC-DC multiplexing converter controls one electrode of the positive electrode and the negative electrode of the battery to be alternately connected to the neutral point and one of the positive and negative direct current buses that has the same polarity as the electrode, to enable a level of the electrode of the battery to synchronously and alternately rise or drop along with the alternate supply of power to the positive and negative direct current buses; or controls one electrode of the positive electrode and the negative electrode of the battery to be constantly connected to the neutral point.

3. The multiplexing current conversion circuit of claim 2:

wherein the positive side arm comprises the first inductor, a first terminal of the first switching transistor is connected to the first terminal of the positive side arm, a second terminal of the first switching transistor is connected to a first terminal of the first inductor, and a second terminal of the first inductor is connected to the second terminal of the positive side arm;

wherein a first terminal of the second switching transistor is connected to the second terminal of the negative side arm and a second terminal of the second switching transistor is connected to the first terminal of the negative side arm; and wherein a first terminal of the third switching transistor is connected to the neutral point, a second terminal of the third switching transistor is connected to a node formed by a connection between an anode of the first diode and a cathode of the second diode, a cathode of the first diode is connected to a node formed by a connection between the second terminal of the first switching transistor and the first terminal of the first inductor, and an anode of the second diode is connected to the first terminal of the second switching transistor.

4. The multiplexing current conversion circuit of claim 3, wherein in response to the positive direct current bus supplying power to the charger, the first switching transistor performs pulse width modulation to reduce voltage and output power, wherein the negative side arm is connected to the neutral point by the third switching transistor; and in response to the negative direct current bus supplying power to the charger, the third switching transistor performs pulse width modulation to reduce voltage and output power, wherein the negative side arm is connected to the negative direct current bus by the second switching transistor.

5. The multiplexing current conversion circuit of claim 4, wherein the first capacitor is connected in series between the second terminal of the positive side arm and the second terminal of the negative side arm and wherein:

during supply of power to the positive direct current bus: in response to the first switching transistor being turned on to enable the positive direct current bus, the first inductor, the first capacitor, and the neutral point to form a loop, the first inductor stores energy, and in response to the first switching transistor being turned off to enable the first inductor and the first capacitor to form a loop, the first inductor supplies power to the respective second terminals of the positive side arm and the negative side arm; and during supply of power to the negative direct current bus: in response to the third switching transistor being turned on to enable the neutral point, the first inductor, the first capacitor, and the negative direct current bus to form a loop, the first inductor stores energy, and in response to the third switching transistor being turned off to enable the first inductor and the first capacitor to form a loop, the first inductor supplies power to the respective second terminals of the positive side arm and the negative side arm.

6. The multiplexing current conversion circuit of claim 2:

wherein a first terminal of the first switching transistor is connected to the first terminal of the positive side arm and a second terminal of the first switching transistor is connected to the second terminal of the positive side arm;

wherein the negative side arm comprises the first inductor, the first terminal of the second switching transistor is connected to a first terminal of the first inductor, a second terminal of the second switching transistor is connected to the first terminal of the negative side arm, and a second terminal of the first inductor is connected to the second terminal of the negative side arm; and wherein a first terminal of the third switching transistor is connected to a node formed by a connection between an anode of the first diode and a cathode of the second diode, a second terminal of the third switching transistor is connected to the neutral point, a cathode of the first diode is connected to a node formed by a connection between the second terminal of the first switching transistor and the first terminal of the first inductor, and an anode of the second diode is connected to the first terminal of the second switching transistor.

7. The multiplexing current conversion circuit of claim 6, wherein in response to the positive direct current bus supplying power to the charger, the third switching transistor performs pulse width modulation to reduce voltage and output power, wherein the positive side arm is connected to the positive direct current bus by the first switching transistor; and in response to the negative direct current bus supplying power to the charger, the second switching transistor performs pulse width modulation to reduce voltage and output power, wherein the positive side arm is connected to the neutral point by the third switching transistor.

8. The multiplexing current conversion circuit of claim 7, wherein the first capacitor is connected in series between the second terminal of the positive side arm and the second terminal of the negative side arm and wherein during supply of power to the positive direct current bus: in response to the third switching transistor being turned on to enable the positive direct current bus, the first capacitor, the first inductor, and the neutral point to form a loop, the first inductor stores energy, and in response to the third switching transistor being turned off to enable the first inductor and the first capacitor to form a loop, the first inductor supplies power to the respective second terminals of the positive side arm and the negative side arm; and during supply of power to the negative direct current bus: in response to the second switching transistor being turned on to enable the neutral point, the first capacitor, the first inductor, and the negative direct current bus to form a loop, the first inductor stores energy, and in response to the second switching transistor being turned off to enable the first inductor and the first capacitor to form a loop, the first inductor supplies power to the respective second terminals of the positive side arm and the negative side arm.

9. The multiplexing current conversion circuit of claim 2, wherein the first, second and third switching transistors are insulated gate bipolar transistors.

10. The multiplexing current conversion circuit of claim 2, wherein the first to third switching transistors are metal-oxide-semiconductor field effect transistors or thyristors.

11. An uninterruptible power supply, comprising:

a single rechargeable battery; and a multiplexing current conversion circuit comprising a power factor correction (PFC) and DC-DC multiplexing converter and a charger, wherein the charger comprises:

a positive side arm connected between a positive direct current bus and a positive electrode of the single rechargeable battery, the positive side arm comprising a first switching transistor;

a negative side arm connected between a negative direct current bus and a negative electrode of the single rechargeable battery, the negative side arm comprising a second switching transistor;

a middle arm connected to a neutral point and comprising a third switching transistor; and a unidirectional conduction circuit connected among the positive side arm, the middle arm, and the negative side arm and configured to constrain current to flow from the negative side arm to the positive side arm and/or the middle arm, the unidirectional conduction circuit comprising first and second diodes connected in series, wherein one of the positive side arm and the negative side arm comprises a first inductor, wherein the charger is alternately powered by the positive and negative direct current buses to charge the single rechargeable battery and alternately connects one electrode of the single rechargeable battery to the neutral point and to one of the positive and negative direct current buses having a same polarity as the electrode, so that a level of the electrode is equivalent to a level of the neutral point or to a level of the one of the positive and negative direct current buses, wherein a first terminal and a second terminal of the positive side arm are connected to the positive direct current bus and the positive electrode of the single rechargeable battery, respectively, and a first terminal and a second terminal of the negative side arm are connected to the negative direct current bus and the negative electrode of the single rechargeable battery, respectively, wherein the PFC and DC-DC multiplexing converter comprises a multiplexing bridge arm, a battery hookup bridge arm, and a control module, wherein the multiplexing bridge arm comprises:

a second inductor having a first terminal selectively connected to utility power or the single rechargeable battery;

fourth and fifth switching transistors connected in series between a second terminal of the second inductor and the neutral point;

a first capacitor connected between the positive direct current bus and the neutral point;

a second capacitor connected between the neutral point and the negative direct current bus; and a third diode and a sixth switching transistor, an anode of the third diode and a first terminal of the sixth switching transistor being connected in common to the second terminal of the second inductor, a cathode of the third diode being connected to the positive direct current bus, and a second terminal of the sixth switching transistor being connected to the negative direct current bus, wherein the battery hookup bridge arm is connected between the single rechargeable battery and the multiplexing bridge arm to control the single rechargeable battery to alternately supply power to the positive and negative direct current buses, wherein the middle arm of the charger and the battery hookup bridge arm of the PFC and DC-DC multiplexing converter are multiplexed, wherein the control module is configured to control switching transistors or switches in the PFC and DC-DC multiplexing converter or the charger, and wherein the PFC and DC-DC multiplexing converter controls one electrode of the single rechargeable battery to be alternately connected to the neutral point and to one of the positive and negative direct current buses having a same polarity as the electrode, to enable a level of the electrode to synchronously and alternately rise or drop along with alternate supply of power to the positive and negative direct current buses, or controls one electrode of the single rechargeable battery to be constantly connected to the neutral point.

* * * * *